(12) United States Patent
Sasaki et al.

(10) Patent No.: US 8,503,817 B2
(45) Date of Patent: Aug. 6, 2013

(54) APPARATUS, METHOD AND IMAGING APPARATUS FOR CORRECTING DISTORTION OF IMAGE DATA USING INTERPOLATION

(75) Inventors: Shogo Sasaki, Osaka (JP); Yoshimasa Okabe, Osaka (JP); Yuji Shigeta, Osaka (JP); Yasutoshi Yamamoto, Osaka (JP); Keiichi Tagano, Osaka (JP)

(73) Assignee: Panasonic Corporation, Osaka (JP)

( * ) Notice: Subject to any disclaimer, the term of this patent is extended or adjusted under 35 U.S.C. 154(b) by 1251 days.

(21) Appl. No.: 11/711,759

(22) Filed: Feb. 28, 2007

(65) Prior Publication Data
US 2007/0211960 A1  Sep. 13, 2007

(30) Foreign Application Priority Data
Mar. 1, 2006  (JP) .................... 2006-054943

(51) Int. Cl.
*G06K 9/40*  (2006.01)
(52) U.S. Cl.
USPC ........................................................ 382/275
(58) Field of Classification Search
USPC ........................................................ 382/275
See application file for complete search history.

(56) References Cited

U.S. PATENT DOCUMENTS

| 5,012,163 A * | 4/1991 | Alcorn et al. .............. 315/383 |
| 5,315,692 A * | 5/1994 | Hansen et al. .............. 345/419 |
| 5,905,530 A | 5/1999 | Yokota et al. |
| 2002/0145669 A1* | 10/2002 | Umeda et al. .............. 348/220.1 |
| 2005/0140803 A1* | 6/2005 | Ohtsuka et al. .............. 348/239 |
| 2006/0110050 A1 | 5/2006 | Aoyama et al. |
| 2007/0025636 A1* | 2/2007 | Furukawa et al. .............. 382/275 |
| 2007/0070079 A1* | 3/2007 | Chung et al. .............. 345/582 |
| 2009/0238485 A1* | 9/2009 | Heaney et al. .............. 382/256 |

FOREIGN PATENT DOCUMENTS

| JP | 5-207351 | 8/1993 |
| JP | 6-165024 | 6/1994 |
| JP | 10-224695 | 8/1998 |
| JP | 3035992 | 2/2000 |
| JP | 2002-56385 | 2/2002 |
| JP | 2002-372662 | 12/2002 |
| JP | 2004-80545 | 3/2004 |

* cited by examiner

*Primary Examiner* — Nirav G Patel
(74) *Attorney, Agent, or Firm* — Wenderoth, Lind & Ponack, L.L.P.

(57) ABSTRACT

An image processing apparatus electrically corrects distortion of an input image to generate an output image. The image processing apparatus includes a correction processing section operable to sequentially read data of the input image for each pixel in an order of scanning, and perform distortion correction for each pixel of the output image using the read data of the pixel. The correction processing section outputs data of a pixel which distortion correction is completed, in an order different from an order of scanning.

11 Claims, 19 Drawing Sheets

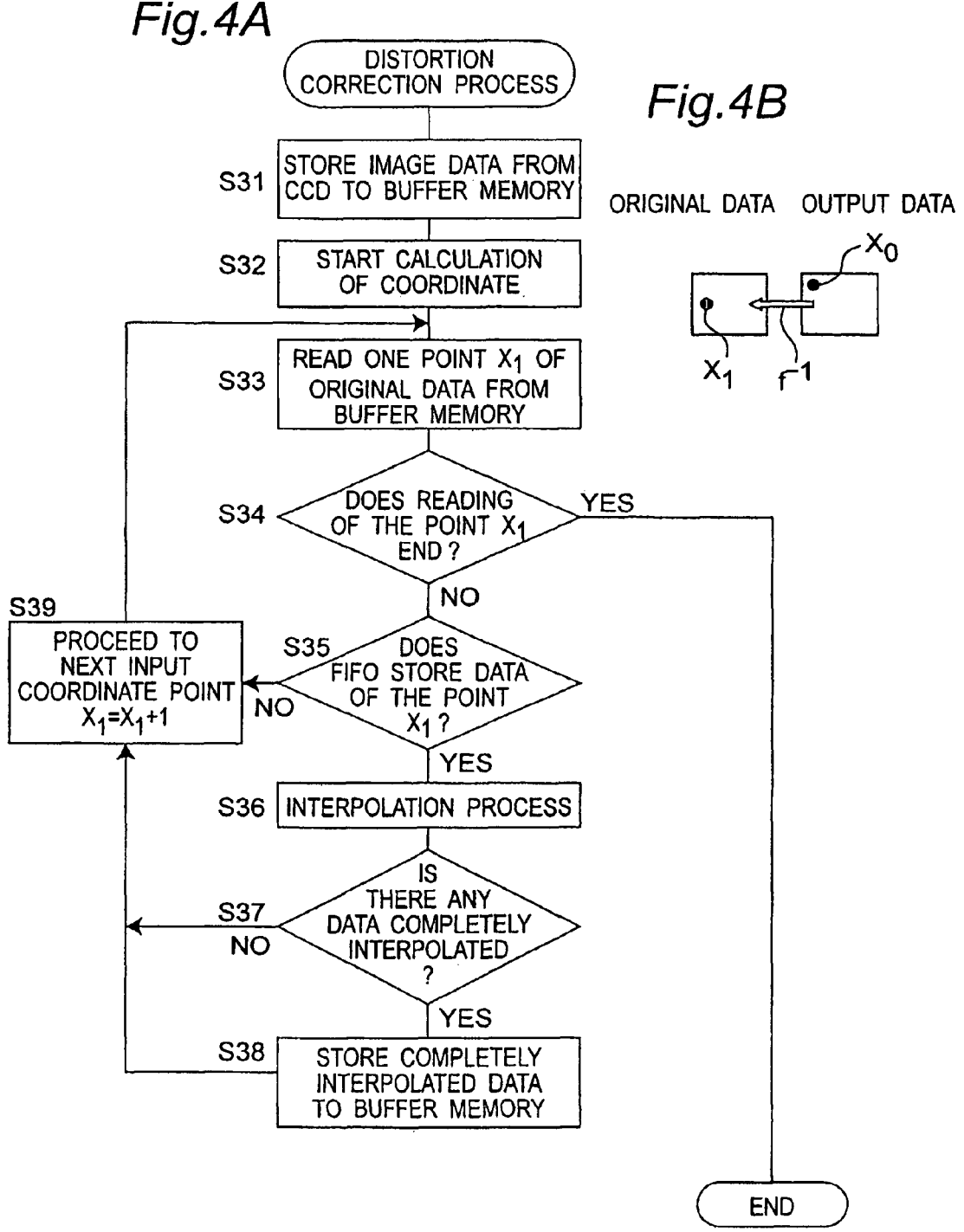

ORIGINAL DATA

OUTPUT DATA

*Fig.17A*
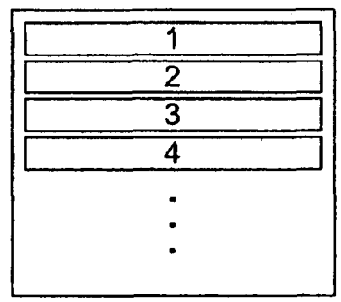
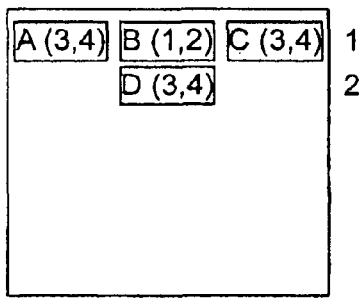
*Fig.17B*
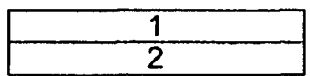
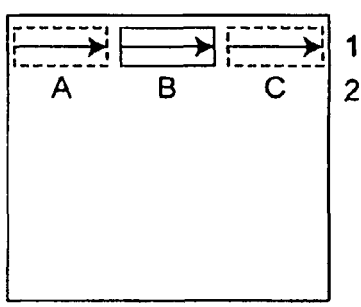
*Fig.17C*
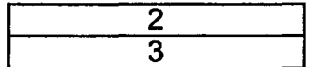
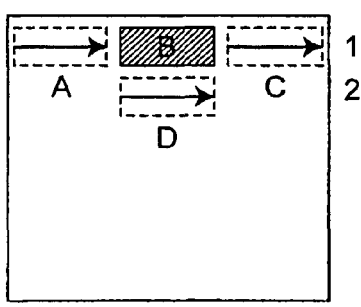
*Fig.17D*
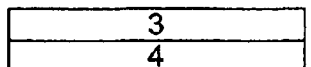
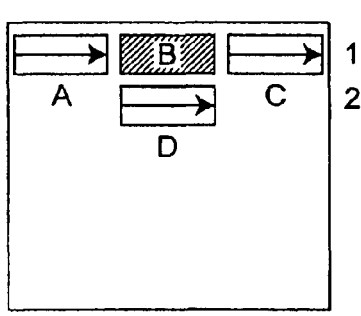
*Fig.17E*
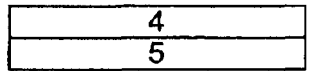
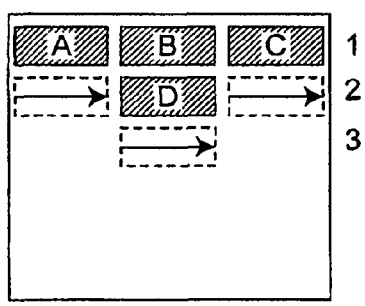

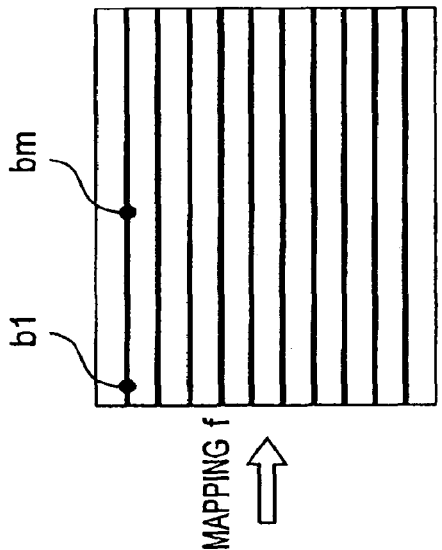
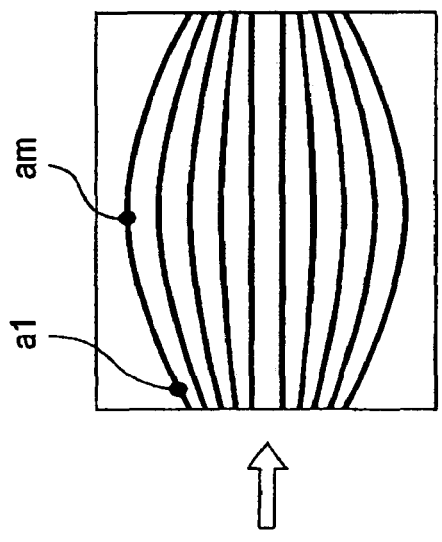
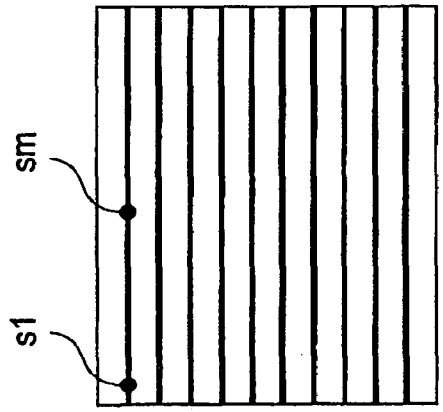

APPARATUS, METHOD AND IMAGING APPARATUS FOR CORRECTING DISTORTION OF IMAGE DATA USING INTERPOLATION

BACKGROUND OF THE INVENTION

1. Field of the Invention

The present invention relates to an image processing apparatus that electronically corrects a distortion of an image imaged by an imaging element, and an imaging apparatus using the same.

2. Related Art

Generally, in an imaging device that images optical information fetched through a lens, a distortion is generated in an imaged image due to an aberration of the lens. There are a barrel-shaped distortion and a spool-shaped distortion as examples of the distortion, and a degree of the distortion is different in accordance with a magnification or a specification of the lens. For example, in a zoom lens, the distortion easily occurs on the wide side (on the side of a shorter focal distance).

In a field of an electronic camera, a technique of electronically correcting the distortion due to the aforementioned lens characteristic (referred to as a "distortion correction" hereafter) is devised (for example, see Japanese Patent No. 3035992).

For example, when an object as shown in FIG. 18A is shot by an electronic camera, the image which is distorted in a barrel shape due to the lens characteristic as shown in FIG. 18B is formed on the imaging element such as a CCD in the electronic camera. FIG. 18C shows such a distorted image which is corrected electronically. In FIGS. 18A to 18C, point s1, point a1, and point b1 correspond to each other, and point sm, point am, and point bm correspond to each other. It is found that a larger distortion appears in the vicinity of the point a1, compared to the vicinity of the point am. As shown in FIG. 18C, the points a1 and am are respectively corrected to be disposed at an original position by means of a distortion correction processing.

The distortion correction processing of the image is achieved by a mapping conversion as follows. A coordinate system on an imaged image (referred to as an "input coordinate system" hereafter.) and a coordinate system on a corrected image (referred to as an "output coordinate system" hereafter.) are taken into consideration. Positions of lattice points in the input coordinate system and output coordinate system are related to positions of pixels of the imaged image and the corrected image, respectively. In the distortion correction processing, in such a coordinate system, image data of each pixel on the input coordinate system is mapped on the output coordinate system using a predetermined function f. Then, image information (luminance information and color difference information) of the lattice points on the output coordinate system (referred to as "output coordinate points" hereafter.) is obtained by interpolating (compositing) the image information of mapped pixels in the vicinity of the lattice points. In this way, the image information regarding each lattice point (pixel) is obtained on the output coordinate system to correct the distortion.

A specific explanation will be made with reference to FIG. 19. The point a1 in the input coordinate system (coordinate system on the imaged image) is mapped to the point b1 in the output coordinate system (coordinate system on the corrected image) with the mapping function f. The other point am in the input coordinate system is mapped to the point bm in the output coordinate system (coordinate system of the corrected image) with the mapping function f. The mapping function f is obtained based on the lens characteristic and a zoom magnification.

Necessary information on the corrected image is image information on the lattice points (output coordinate points), and generally, the mapped points b1 and bm of the output coordinate system do not exist on the output coordinate system. Therefore, image data of an output coordinate point is obtained by interpolating (compositing) the image data of a plurality of pixels mapped in the vicinity of the output coordinate point. For example, as shown in FIG. 19, the image data of an output coordinate point Q1 can be obtained by interpolating (compositing) the image data of pixels b1, b2, bk and bk+1 mapped to the vicinity of the output coordinate point Q1. Similarly, the image data of an output coordinate point Qm can be obtained by interpolating (compositing) the image data of pixels bm, bm+1, bn and bn+1 mapped to the vicinity of the output coordinate point Qm. In this way, in the output coordinate system, the image data of the output coordinate point, namely, corrected data is obtained by interpolation (composition).

As described above, the distortion correction all over the image is performed by obtaining the mapped points on the output coordinate system and compositing the image data, while sequentially scanning each input coordinate point over the imaged image.

In FIG. 18C, a region in the vicinity of the point b1 is obtained by interpolating regions which having relatively large distortion in the imaged image, and a region in the vicinity of the point bm is obtained by interpolating regions which having relatively small distortion in the imaged image. For correction of a region with large distortion such as a region in the vicinity of the point b1, image portion for plurality of lines in the imaged image should be read to obtain information required for correction. On the contrary, for correction of a region with small distortion such as a region in the vicinity of the point bm, image portion for relatively small number of lines in the imaged image should be read to obtain information required for correction Like this, in order to obtain one line of a corrected image by mapping, there may be a case which requires data corresponding to a lot of lines in the input image. That is, in order to output the corrected image data to a buffer memory in each line, some memories are required for holding data for a lot of lines in the imaged image during wait for processing of unprocessed pixels. However, provision of a lot of line memories causes a problem in a configuration to increase number of electronic parts by the number of line memories.

SUMMARY OF THE INVENTION

The present invention is directed to solve the above described problem, and has a purpose to provide an imaging apparatus having simple structure and capable of correcting image distortion caused by lens characteristic.

An image processing apparatus according to the present invention is an image processing apparatus for electrically correcting distortion of an input image to generate an output image. The image processing apparatus includes: a correction processing section operable to sequentially read data of the input image for each pixel in an order of scanning, and perform distortion correction for each pixel of the output image using the read data of the pixel. The correction processing section outputs data of a pixel which distortion correction is completed, in an order different from an order of scanning the output image.

The correction processing section may include a line memory operable to temporally store data of the input image for a plurality of lines, which is a part of the input image, a controller operable to determine whether data of a plurality of input pixels required for generating data of an output pixel is stored in the line memory, and a compositing section operable to, when determining that the data of a plurality of input pixels required for generating data of the output pixel is stored in the line memory, perform composition of data of the plurality of input pixels to correct distortion.

The correction processing section may further include a coordinate calculation section operable to calculate an inverse mapping point on the input image corresponding to a pixel of the output image. The controller may determine whether the data of a plurality of input pixels is stored in the line memory basing on the inverse mapping point calculated by the coordinate calculation section.

The correction processing section may include information relating a pixel of an input image to a pixel of an output image which is composited using the data of the pixel of the input image.

The correction processing section may further include a cache memory for temporally storing data of the pixel which distortion correction is completed and outputting the data in page unit.

An imaging apparatus according to the present invention includes a lens, an imaging element operable to convert optical information received through the lens into an electrical image information, and an imaging processing apparatus aforementioned, operable to electrically correct distortion of image data imaged by the imaging element.

A distortion correction method according to the present invention is a method of electrically correcting distortion of an input image to generate an output image. The distortion correction method includes sequentially reading data of the input image for each pixel in an order of scanning, performing distortion correction for each pixel of the output image using the read data of the pixel to obtain data of each pixel of the output image, outputting data of a pixel which distortion correction is completed, in an order different from an order of scanning the output image.

According to the present invention, it is enough to store input image data for the number of lines required for interpolation in a line memory, for interpolation in a distortion correcting process, and thus it does not need to prepare input image data for a lot of lines. Consequently, the present invention can reduce capacity of a line memory and simplify structure of the imaging apparatus.

BRIEF-DESCRIPTION OF DRAWINGS

FIG. 4A is a flowchart of the distortion correction processing by the imaging apparatus of the first embodiment.

FIG. 4B is a view explaining an inverse mapping from output data to original data.

FIGS. 17A to 17E are views for specifically explaining the distortion correction processing in the fourth embodiment.

FIGS. 18A to 18C are views explaining an image distorted caused by a lens characteristic and an image after distortion correction.

DETAILED DESCRIPTION OF THE INVENTION

Preferred embodiments of the present invention will be explained hereunder, with reference to the appended drawings.

In the following description, data regarding luminance information and color difference information of a pixel is referred to as "pixel data". Also, image data before distortion correction obtained on an imaging element is referred to as "original data", and image data after distortion correction is referred to as "output data". In addition, a coordinate system on the original data is referred to as an "input coordinate system", the coordinate system on the output data is referred to as an "output coordinate system". Each of lattice points on the input coordinate system and the output coordinate system are provided with a position of the lattice point corresponding to a position of each pixel of the original data and the output data. The lattice points on the input coordinate system and the output coordinate system are referred to as "input coordinate points" and "output coordinate points", respectively.

First Embodiment (Configuration of Imaging Apparatus)

Figure 1:
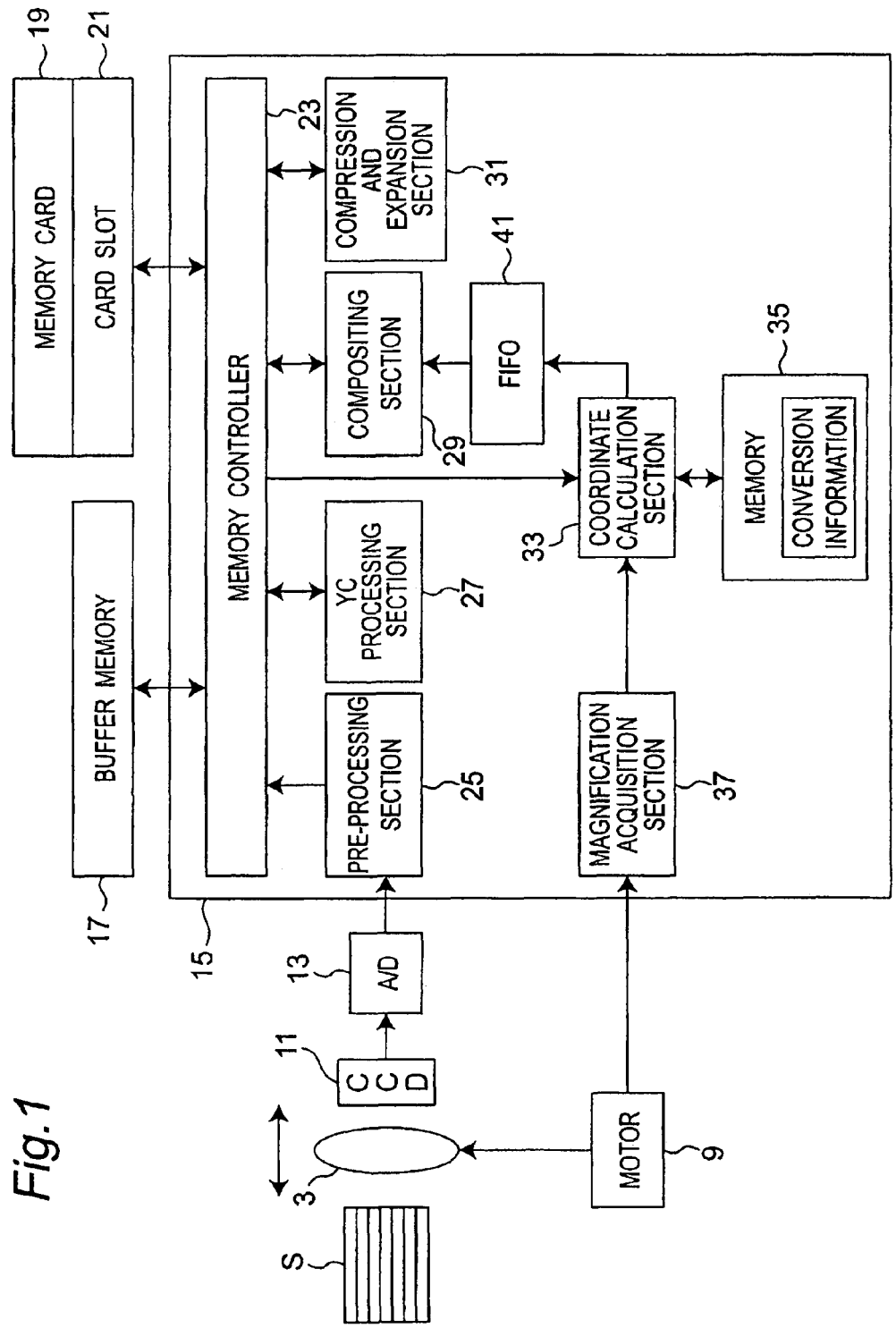
FIG. 1 is a view showing a configuration of an imaging apparatus of a first embodiment of the present invention.

FIG. 1 is a view showing a configuration of the imaging apparatus of the present invention. The imaging apparatus includes a lens 3, a CCD 11 which is an imaging element for converting optical information into an electrical signal, an AD converter 13 for converting an analogue signal into a digital signal, an image processing circuit 15 for controlling an overall operation of the imaging apparatus, a buffer memory 17 for temporarily storing image data before and after distortion correction, and a card slot 21 loaded with a memory card 19 for storing the image data. The imaging apparatus further includes a motor 9 for driving the lens 3 in a focus operation and a zoom operation.

The image processing circuit 15 includes a memory controller 23 for controlling an access of each processing section in the image processing circuit 15, the buffer memory 17 and memory card 19, a pre-processing section 25 for applying pre-processing such as a gamma correction to the image data, a YC processing section 27 for performing YC processing, a compositing section 29 for compositing (interpolating) pixel data for a plurality of input coordinate points to obtain the corrected pixel data, and a compression and expansion section 31 for applying compression/expansion processing to the image. The YC processing is process to separate Y signal (luminance component) from C signal (color component) of the image data for facilitating the compression processing thereafter. The image processing circuit 15 further includes a coordinate calculation section 33, a memory 35, a magnification acquisition section 37, and a FIFO memory 41. In this embodiment, the memory controller 23, the compositing section 29, the coordinate calculation section 33, the memory 35, and the FIFO memory 41 compose a correction processing section.

The coordinate calculation section 33 has a function of calculating an inverse mapping $f^{-1}$ (details are described later) for distortion correction. The magnification acquisition section 37 acquires information regarding a zoom magnification from the motor 9. The memory 35 stores information necessary for calculating the inverse mapping $f^{-1}$ (information regarding a function of the inverse mapping $f^{-1}$ under various conditions).

The inverse mapping $f^{-1}$ is described below. A mapping f is mapping for relating a point on the coordinate system (input coordinate system) of the original data to a point on the output coordinate system of the image after distortion correction. The inverse mapping $f^{-1}$ is inverse mapping of the mapping f, and is a function for relating each point of the output coordinate system on the image after distortion correction to each point of the input coordinate system on the imaging element before distortion correction. The mapping f and inverse mapping $f^{-1}$ are determined in accordance with the lens characteristic and the zoom magnification.

The FIFO memory 41 stores information indicating which output coordinate point (pixels of the output image) of the output data (called "corresponding coordinate point list" hereafter) is interpolated using an input coordinate point (pixel) of the original data. Details of the corresponding coordinate point list will be described later.

(Overall Operation of Imaging Apparatus)

An overall operation of the imaging apparatus configured as described above will be explained.

In the imaging apparatus, optical information inputted through the lens 3 is converted into the analogue electrical signal by the CCD 11. The AD converter 13 converts the analogue electrical signal from the CCD 11 into the image information of the digital signal. The image processing circuit 15 receives the image information of the digital signal from the AD converter 13, applying a predetermined image processing thereto, and finally records it in the memory card 19.

More specifically, in the image processing circuit 15, pre-processing such as gamma processing is applied to the image signal from the AD converter 13 by the pre-processing section 25, and the YC processing is applied thereto by the YC processing section 27. The image data after those processing is stored in the buffer memory 17.

Next, the distortion correction is made to the image data stored in the buffer memory 17, by the compositing section 29 and the coordinate calculation section 33, etc. The image data after distortion correction is stored in the buffer memory 17 again. The image distortion-corrected image is thus obtained in the buffer memory 17.

(Generation of Corresponding Coordinate Point List)

Generation of the corresponding coordinate point list stored in the FIFO memory 41 will be explained. The corresponding coordinate point list is generated by the coordinate calculation section 33 as follows.

The coordinate calculation section 33 obtains an inverse mapping point on the original data with the inverse mapping $f^{-1}$ for each output coordinate point. The input coordinate point of the original data that exists in an area within a predetermined range Δ around the inverse mapping point thus obtained, is defined as an input coordinate point which is necessary for interpolation to obtain the pixel data of the output coordinate point. The coordinate calculation section 33 relates the input coordinate point obtained in such a method to the output coordinate point to obtain the corresponding coordinate point list, and outputs it to the FIFO memory 41.

Figure 2:
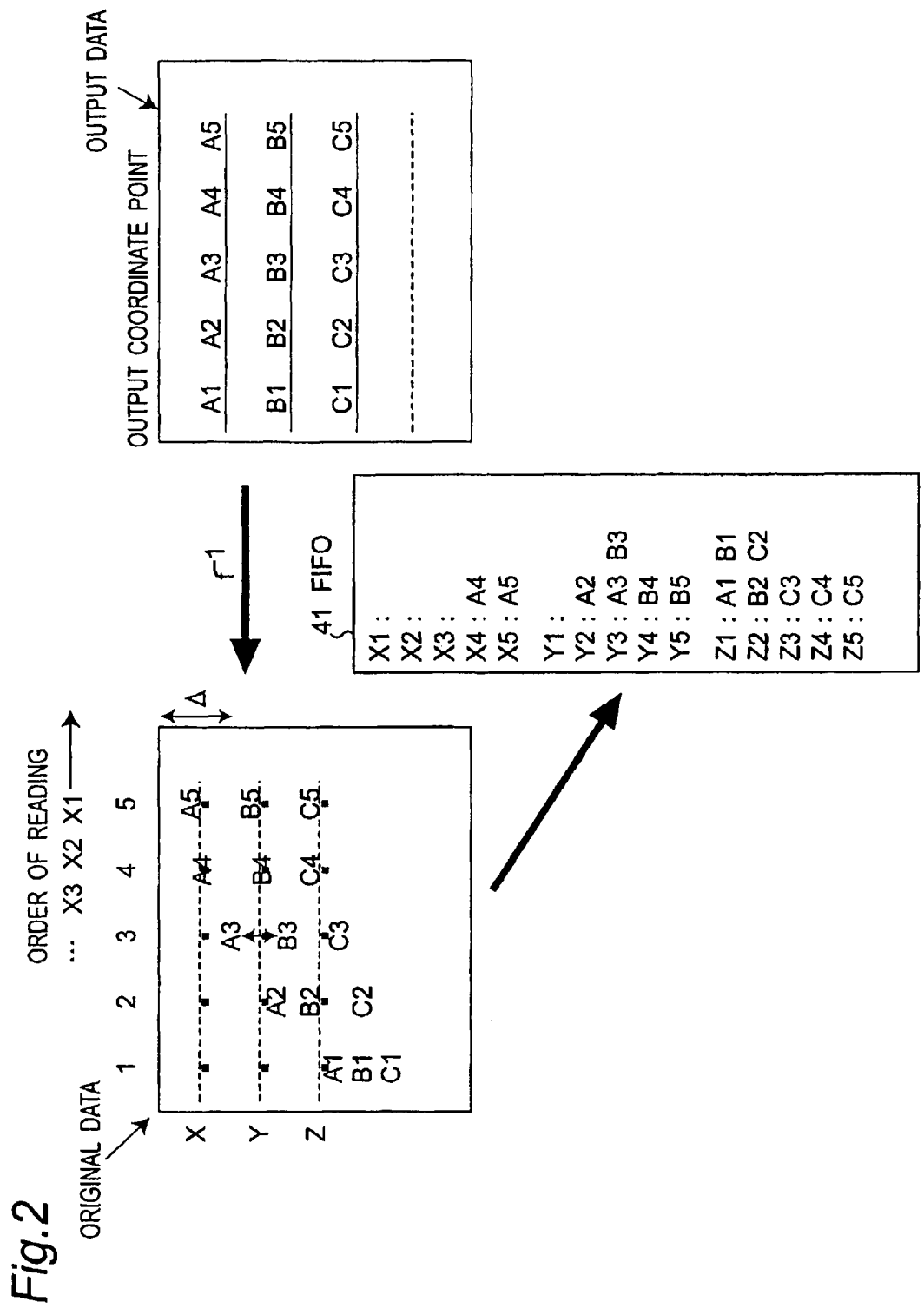
FIG. 2 is a view showing a correspondence between pixels of original data and pixels of output data, and a data structure example of data stored in a FIFO memory.

FIG. 2 is a view showing the relation between the input coordinate point in the original data and the output coordinate point in the output data with the lens 3 having a barrel distortion characteristic. FIG. 2 further shows an example of the corresponding coordinate point list stored in the FIFO memory 41.

For example, in FIG. 2, the inverse mapping point of the output coordinate point A1 of the output data is positioned in the vicinity of the input coordinate point Z1. Similarly, the inverse mapping point of the output coordinate point B1 is also positioned in the vicinity of the input coordinate point Z1. Both of the inverse mapping points of the output coordinate points A1 and B1 are respectively within the predetermined range Δ around the input coordinate point Z1. Therefore, in an example shown in FIG. 2, the input coordinate point Z1 of the original data becomes a point necessary for interpolation for obtaining pixel data of the output coordinate points A1 and B1. Accordingly, in the corresponding coordinate point list of the FIFO memory 41, the input coordinate point Z1 and the output coordinate points A1 and B1 are related to each other to be recorded. From the corresponding coordinate point list as shown in FIG. 2, it is found that the input coordinate points X1 and X2 are not used for interpolation of any output coordinate point and that the input coordinate point Y2 is necessary for interpolation of the output coordinate point A2. Note that the corresponding coordinate point list stored in the FIFO memory 41 does not always include simultaneously information regarding all of the input coordinate points, and may include only information regarding the input coordinate points of the number of lines required in the processing in which the corresponding coordinate point list is referenced. For example, the corresponding coordinate point list may be generated for every ten lines of the original data, in accordance with the input coordinate point of the original data to be processed.

(Distortion Correction Processing)

Figure 3:
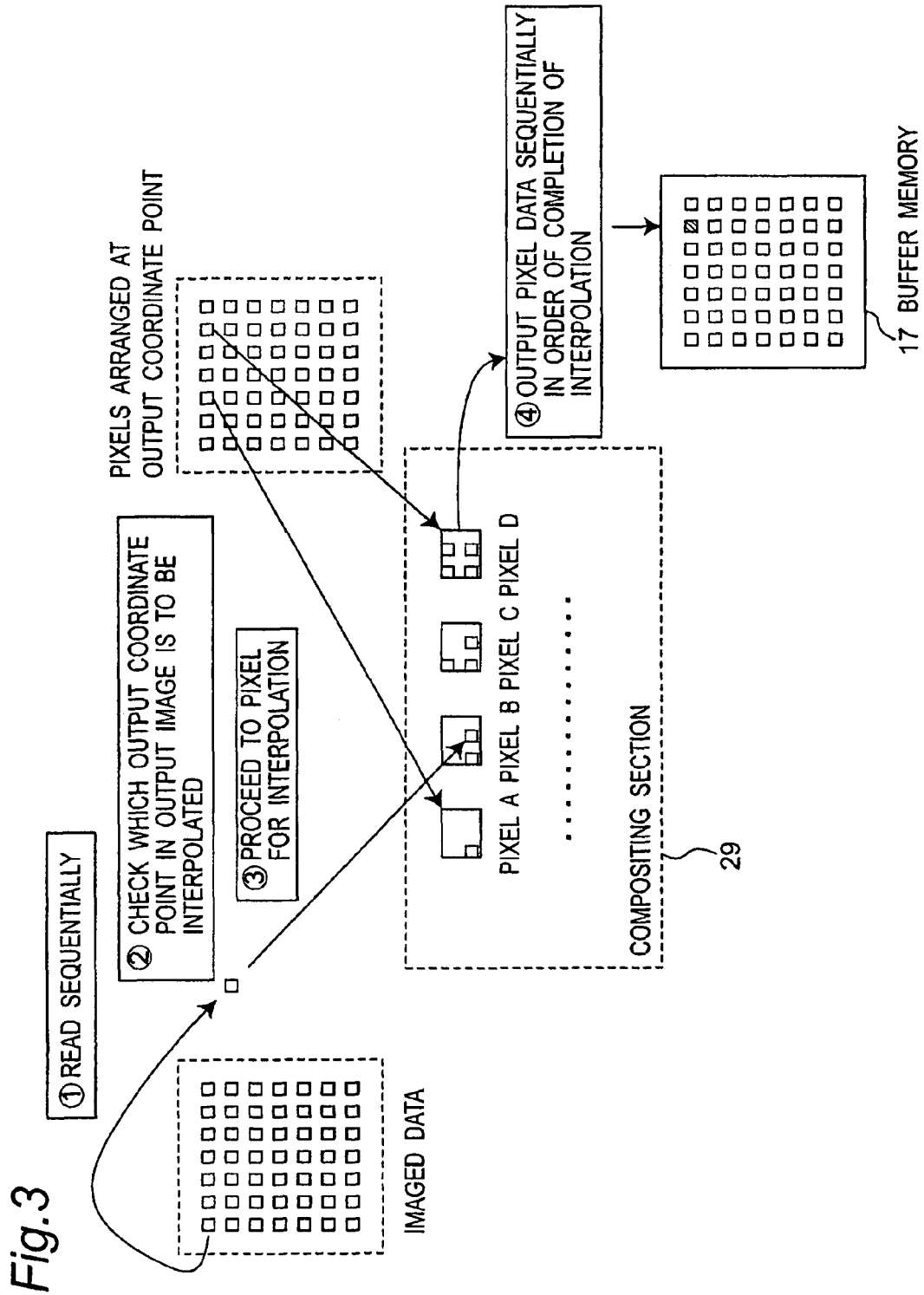
FIG. 3 is a view for explaining a distortion correction processing in the first embodiment.

An outline of the distortion correction processing of the imaging apparatus of this embodiment will be explained with reference to FIG. 3.

In the present embodiment, the pixel data of the input coordinate point on the original data is sequentially read from the buffer memory 17, and the corresponding coordinate point list stored in the FIFO memory 41 is referenced. It is determined whether or not an input coordinate point is used for interpolation (composition) of the image data of any one of output coordinate points. For example, in the corresponding coordinate point list as shown in FIG. 2, it is so determined that an input coordinate point X1 is used for none of output coordinate points (pixels of the output image), and it is so determined that the input coordinate point Y3 is used for the interpolation of the output coordinate points A3 and B3 of the output data.

When it is so determined that an input coordinate point is used for interpolation of any one of output coordinate points, the pixel data of this input coordinate point is sent to the compositing section 29, and is stored in a predetermined storage area with the pixel data of this input coordinate point related to the output coordinate point (pixel of the output image). The number of the input coordinate points requiring interpolation for each output coordinate point (pixel of the output image) is previously determined. FIG. 3 shows an example of using four input coordinate points for interpolation of one output coordinate point. The compositing section 29 determines whether or not all input coordinate points required for interpolation are provided for each output coordinate point, and performs interpolation for the output coordinate point which is provided with all the required input coordinate points, and outputs the interpolation result to the buffer memory 17. In FIG. 3, all the input coordinate points required for interpolation are provided for the output coordinate point corresponding to a pixel D. Therefore, the interpolation is applied for the output coordinate point and the interpolation result is outputted to the buffer memory 17. Regarding the output coordinate points corresponding to pixels A to C, only a part of the required output coordinate points are provided, and therefore the interpolation is not applied thereto and no data is outputted to the buffer memory 17.

As described above, in the distortion correction of the present embodiment, it is determined whether or not each input coordinate point of the original data is used for interpolation of output coordinate points. Only the pixel data of the input coordinate point determined to be used for the interpolation of the output coordinate point is stored, associated with the output coordinate point (pixel of the output image). Then, in an order that information of the required input coordinate point is provided, the interpolation processing of the output coordinate point is sequentially performed, and the output coordinate point thus interpolation-processed is outputted. Therefore, a scanning order of the output image and an output order of corrected data do not coincide with each other. Here, the scanning order of the output image is an order that the output image once stored in the buffer memory 17 is read to the memory controller 23 again, and is an order for advancing on an image horizontally from the upper left of the image, repeating the horizontally advancing in a vertical lower direction.

FIG. 4A is a flowchart showing the distortion correction processing by the imaging apparatus of the present embodiment.

The image data imaged by the CCD 11 is subjected to a predetermined processing by the pre-processing section 25 and the YC processing section 27, and thereafter is stored in the buffer memory 17 as the original data (S31). Next, the coordinate calculation section 33 starts to generate the corresponding coordinate point list indicating which output coordinate point of the output data is interpolated using the input coordinate point of the original data (S32). The corresponding coordinate point list thus generated is stored in the FIFO memory 41.

The memory controller 23 reads pixel data of one input coordinate point x1 from the buffer memory 17 (S33). When the input coordinate point x1 can be read (NO in S34), the memory controller 23 sequentially reads data of the corresponding coordinate point list from the FIFO memory 41, and determines whether or not the input coordinate point x1 exists in the corresponding coordinate point list (S35). Namely, with reference to the corresponding coordinate point list, it is determined whether or not the input coordinate point x1 is used for interpolation of any one of the output coordinate points.

When the input coordinate point x1 does not exist in the corresponding coordinate point list, namely, when it is so determined that the input coordinate point x1 is not used for interpolation of any one of the output coordinate points, the input coordinate point x1 is not particularly processed, and the processing is advanced to the next input coordinate point (S39) to execute the same processing as described above. Note that the memory controller 23 sequentially reads and processes the pixel data from the top to the bottom for each line and from the left to the right in the line, starting from the upper left end of the image.

When the input coordinate x1 exists in the corresponding coordinate point list, namely, when it is so determined that the input coordinate point x1 is used for the interpolation of any one of the output coordinate points, the memory controller 23 sends the pixel data of this input coordinate point x1 to the compositing section 29, and the interpolation processing is executed by the compositing section 29 (S36). Specifically, the compositing section 29 stores the pixel data of the input coordinate point x1 in the storage area corresponding to the output coordinate point which is associated with the input coordinate point by the corresponding coordinate point list. Thereafter, the compositing section 29 determines whether or not the input coordinate points of the number required for interpolation are provided for each output coordinate point. When they are provided, the compositing section 29 performs the interpolation processing (composition processing) using the pixel data of the stored input coordinate points to obtain the pixel data of the output coordinate point, namely, the corrected pixel data.

After the interpolation processing is finished, the memory controller 23 determines whether or not there is the output coordinate point for which interpolation processing is completed (S37). When an interpolation-completed output coordinate point exists, the pixel data of this output coordinate point is recorded in the buffer memory 17 (S38). When it is so determined that no interpolation-completed output coordinate point exists, the processing is advanced to the next input coordinate point (S39), and then the same processing as described above is repeated.

Meanwhile, in step S34, when reading of all of the input coordinate points x1 of the original data from the buffer memory 17 is finished (YES in S34), the processing is finished.

(Outputting State of Distortion Corrected Data)

Figure 5A:
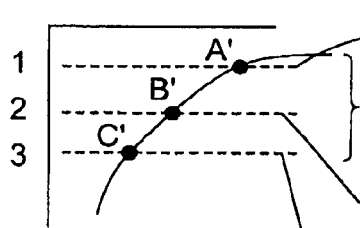
FIGS. 5A to 5D are views explaining a advancing status of the distortion correction processing by the first embodiment.
Figure 5B:
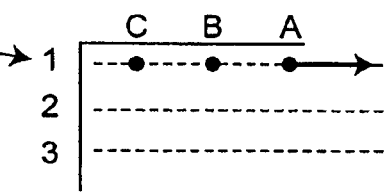
Figure 5C:
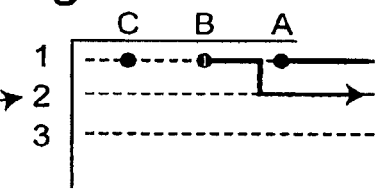
Figure 5D:
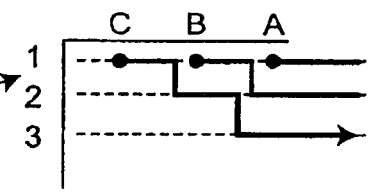
Figure 6A:
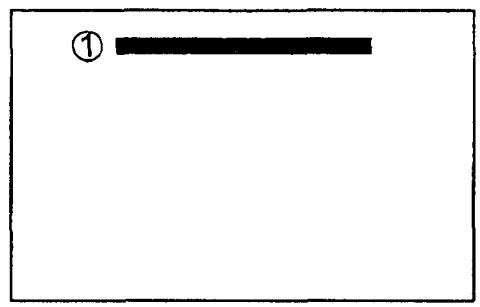
FIGS. 6a to 6C are views explaining a generation situation of image data after distortion correction by the distortion correction processing of the first embodiment.
Figure 6B:
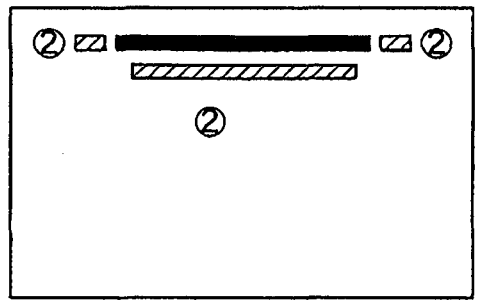
Figure 6C:
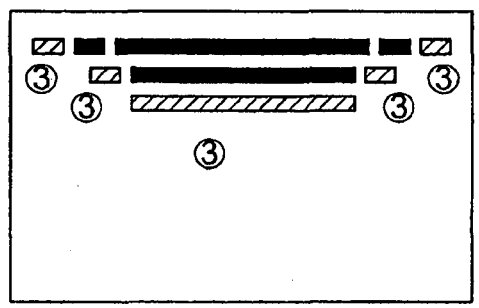

With reference to FIGS. 5A to 5D and FIGS. 6A to 6C, an outputting state of distortion corrected data according to the present embodiment will be explained. FIG. 5A shows the original data, and FIGS. 5B to 5D show an advancing state of the distortion correction processing in the output data, respectively. FIGS. 6A to 6C are views showing the outputting state of the image data after distortion correction which is outputted to the buffer memory 17.

When a first line of the original data is scanned, data after an input coordinate point A' (on the right side of A') is read, but data of input coordinate points B' and C' used for interpolation of the output coordinate points B and C has not bee read yet. Therefore, at this time, as shown in FIG. 5B, the interpolation processing of only a part of output coordinate points including the output coordinate point A is completed, and data of the part of output coordinate points interpolated completely are outputted to the buffer memory 17. Therefore, the state of the corrected data which is outputted to the buffer memory 17 becomes a state as shown in FIG. 6A.

Next, when a second line of the original data is scanned, the data after an input coordinate point B' is read, but the data of a pixel C' required for interpolation of the output coordinate point C has not been read yet. Therefore, at this time point, as shown in FIG. 5C, the data between the output coordinate point B and the output coordinate point A in the first line of the output data is newly interpolated, and the interpolated data is outputted to the buffer memory 17. Further, in the second line of the output data, the output coordinate point in the center part is interpolated. Therefore, the outputting state of the corrected data which is outputted to the buffer memory 17, becomes a state as shown in FIG. 6B.

Further, when a third line of the original data is scanned, the data after an input coordinate point C' is read. Therefore, at this time, as shown in FIG. 5D, the data between the output coordinate point C and the output coordinate point B in the first line of the output data is newly interpolated, and the interpolated data is outputted to the buffer memory 17. Also, in the second and third lines of the output data, the output coordinate point in the center part is interpolated. Therefore, the outputting state of the corrected data which is outputted to the buffer memory 17 becomes a state as shown in FIG. 6C.

As described above, in this embodiment, even if the image of the original data is scanned from the upper left end of the image, the image data after distortion correction is not outputted to the buffer memory 17 from the upper left end of the image, but is outputted from the interpolation-completed pixel, namely, as shown in FIG. 6, from the center part of the line. Therefore, an order of outputting the distortion-corrected pixel to the buffer memory 17 is different from an order (a pixel order of the output image) of reading from the buffer memory 17 again a correction-completed output image stored in the buffer memory 17.

As described above, according to the imaging apparatus of this embodiment, when the interpolation is performed in the distortion correction processing, it is first sufficient to provide a line memory which has a capacity capable of storing input image data of the number of lines required for the interpolation processing, and the input image data of a large number of lines needs not to be stored. Therefore, according to the imaging apparatus of this embodiment, the capacity of the line memory can be reduced, and a simplification of the structure of the imaging apparatus can be realized.

In addition, according to the imaging apparatus of this embodiment, the inverse mapping point in the original data corresponding to the output coordinate point of the output data is obtained. Using the pixel data in the vicinity of the inverse mapping point, the pixel data of the output coordinate point is obtained. The pixel data obtained in this method is absolutely the data present on the lattice point of the output coordinate system, and is interpolated by the input coordinate system without distortion. Therefore, an excellent image including no error can be obtained. Meanwhile, in a conventional technique wherein the input image is once mapped and thereafter interpolated, the mapping point is not necessarily present on the lattice point of the output image, and the mapped coordinates are distorted. Nevertheless, the interpolation is applied to the output data with the distorted lattice which is deemed as a square lattice. This poses a problem that an error is included in the output data. However, according to the imaging apparatus of this embodiment, for the reason as described above, the pixel data is definitely present on the lattice point of the output coordinate system, and thus the aforementioned conventional problem can be solved.

Second Embodiment

Figure 7:
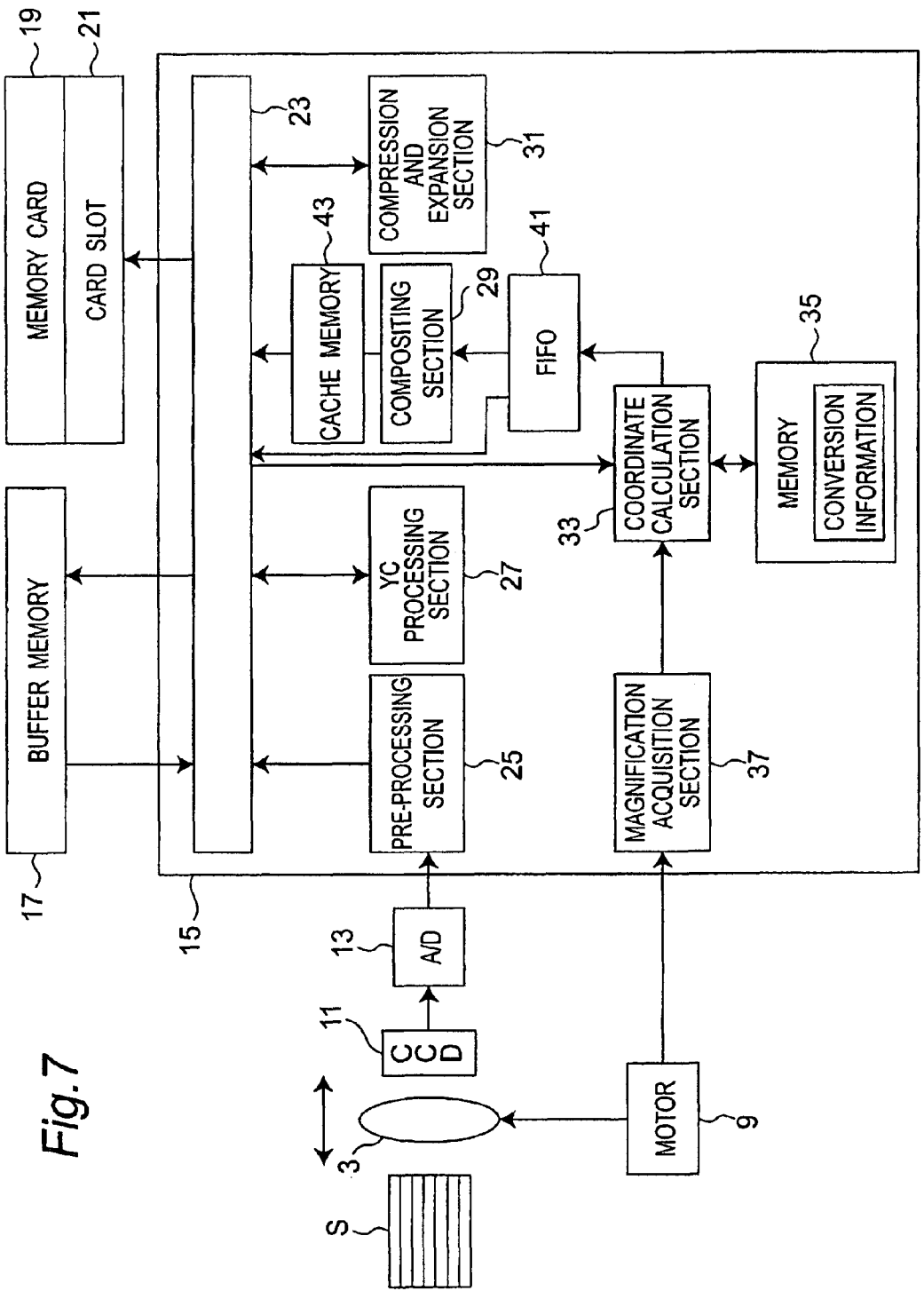
FIG. 7 is a view showing a configuration of an imaging apparatus according to a second embodiment of the present invention.

FIG. 7 is a view showing the configuration of the imaging apparatus according to another embodiment of the present invention.

The imaging apparatus according to this embodiment further includes a cache memory 43 between the compositing section 29 and the memory controller 23. The cache memory 43 stores pixels which are interpolated (composited) completely pixel in the compositing section 29 by every page. A basic operation of the imaging apparatus of this embodiment is the same as that of the first embodiment. However, a processing of the distortion correction for the cache memory 43 is different. Note that in this embodiment, the memory controller 23, the compositing section 29, the coordinate calculation section 33, the memory 35, the FIFO memory 41, and the cache memory 43 compose the correction processing section.

Figure 8:
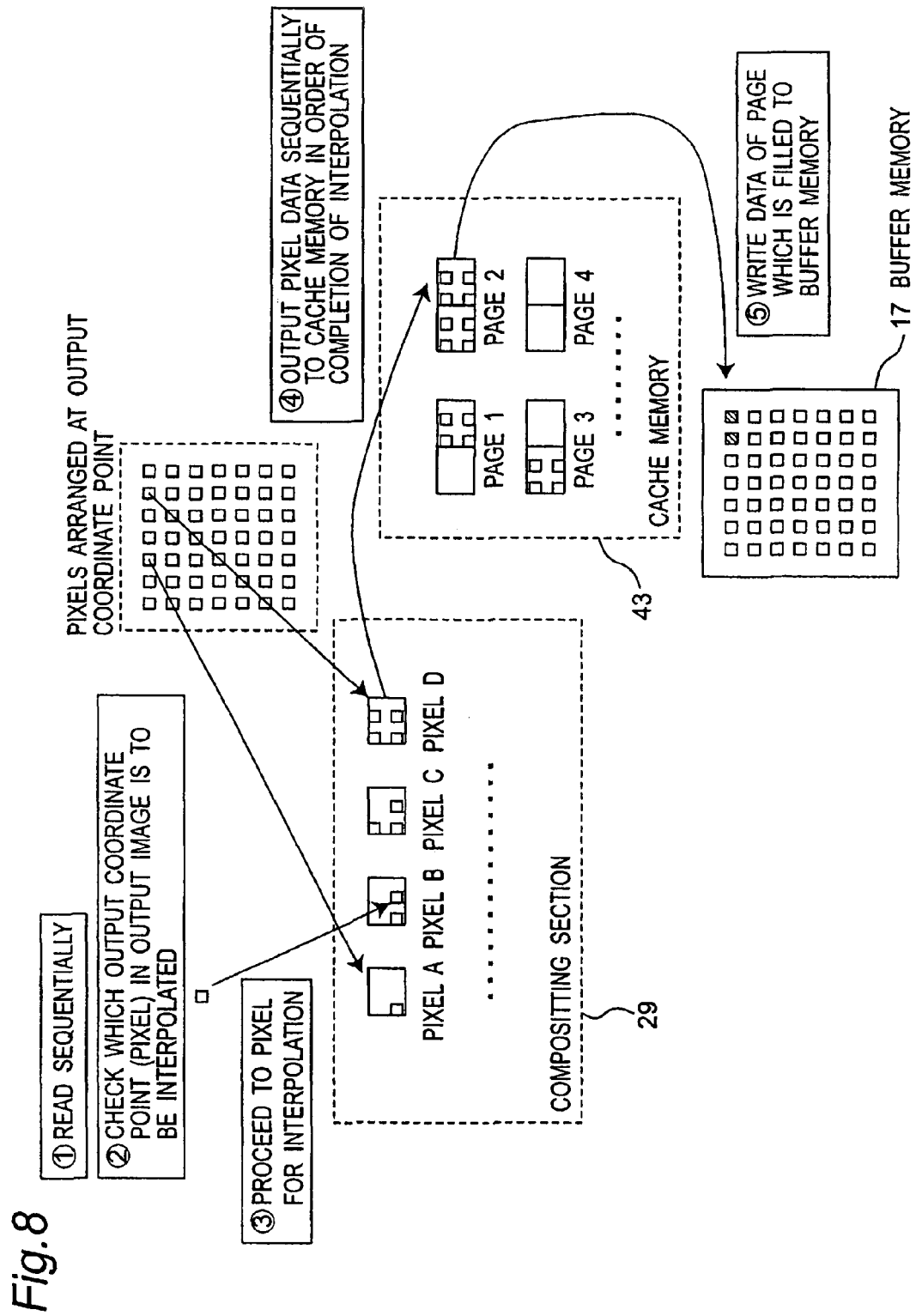
FIG. 8 is a view for explaining the distortion correction processing in the second embodiment.

FIG. 8 is a view explaining the distortion correction processing of this embodiment. The pixel data of the input coordinate point of the original data is sequentially read from the buffer memory 17, and with reference to the corresponding coordinate point list stored in the FIFO memory 41, it is determined which output coordinate points are obtained by interpolation with the input coordinate point. When this input coordinate point is determined to be used for the interpolation of any one of the output coordinate points, the information of this input coordinate point is sent to the compositing section 29. In the compositing section 29, the pixel data of this input coordinate point is stored, related to the output coordinate point (the pixel of the output image). Regarding each output coordinate point, the compositing section 29 determines whether or not the input coordinate points required for interpolation are provided, applies the interpolation processing for the output coordinate point provided with the required output coordinate, and outputs it to the cache memory 43.

The cache memory 43 manages the output coordinate point (the pixel of the output image) by every page, and when a page which is filled with the output coordinate points is generated, outputs the data of the page to the buffer memory 17. In an example of FIG. 8, the data of the page 2 is outputted to the buffer memory 17. In the cache memory 43, an area from which the data is outputted to the buffer memory 17 is released.

In this way, in this embodiment, the pixel data is outputted to the buffer memory 17 for every page. Note that in an example of FIG. 8, although one page is composed of two pixels. However, one page may be composed of further more pixels.

Figure 9:
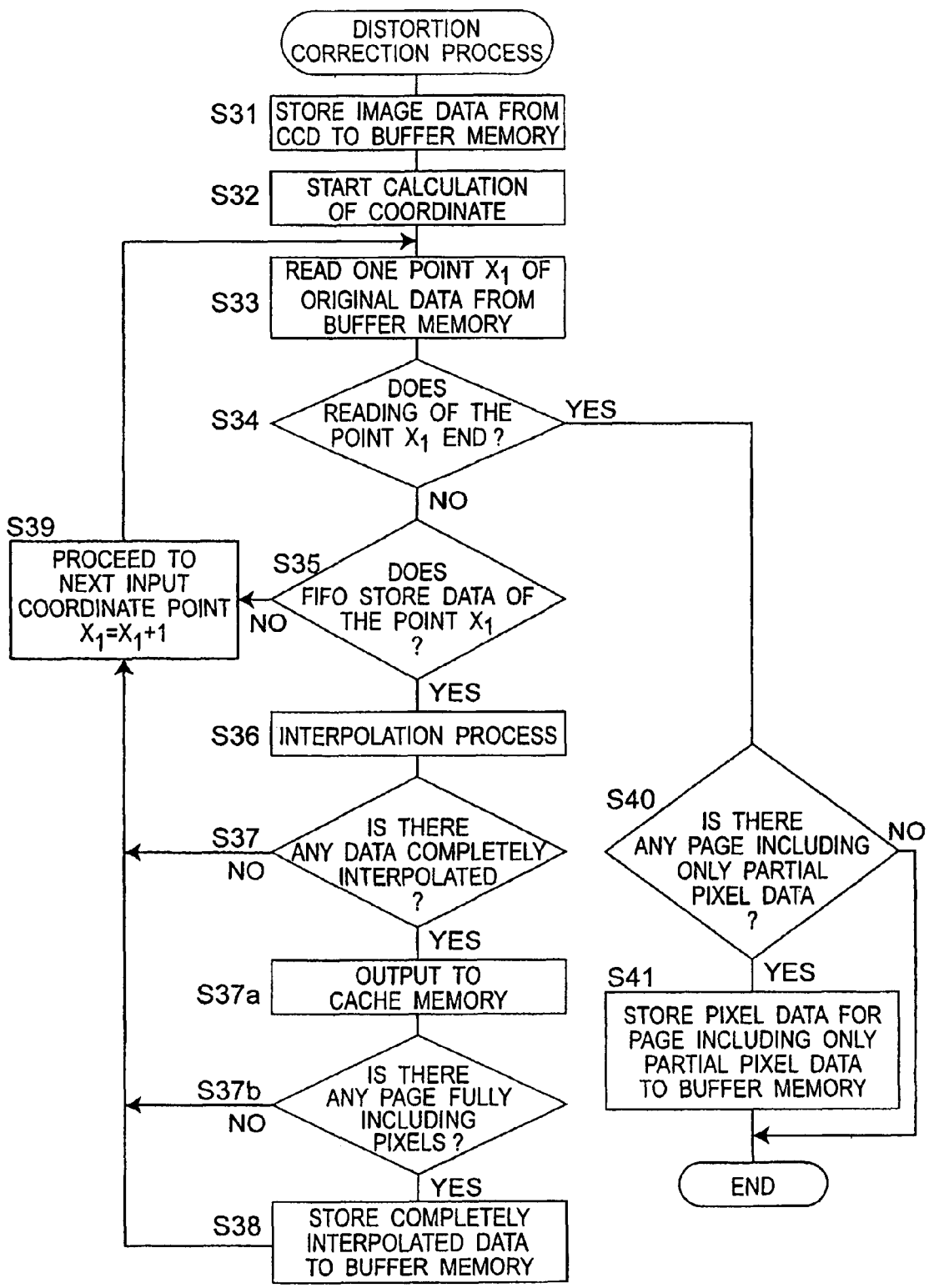
FIG. 9 is a flowchart of the distortion correction processing by the imaging apparatus of the second embodiment.

FIG. 9 is a flowchart showing the distortion correction processing by the imaging apparatus of this embodiment. The flowchart of FIG. 9 further has step S37a and step S37b between step S37 and step S38 as well as step S40 and step S41 between step S34 and end, in addition to the steps of the flowchart as shown in FIG. 4A.

In this embodiment, the pixel data of the completely interpolated output coordinate point (the pixel of the output image) is once outputted to the cache memory 43 from the compositing section 29 (S37a). The memory controller 23 outputs data of a page to the buffer memory 17 when the page is fully filled with pixels in the cache memory 43 (S37b and S38). When reading of all of the input coordinate points x1 of the original data from the buffer memory 17 is finished (YES in S34), data for a page which is partially filled but is not completely filled with pixels is outputted from the cache memory 43 to the buffer memory 17.

In this embodiment, since the interpolated data is outputted to the buffer memory 17 by every page, the number of accesses to the buffer memory 17 can be reduced, compared to a case of the first embodiment, and a processing speed can be further improved.

Third Embodiment

Figure 10:
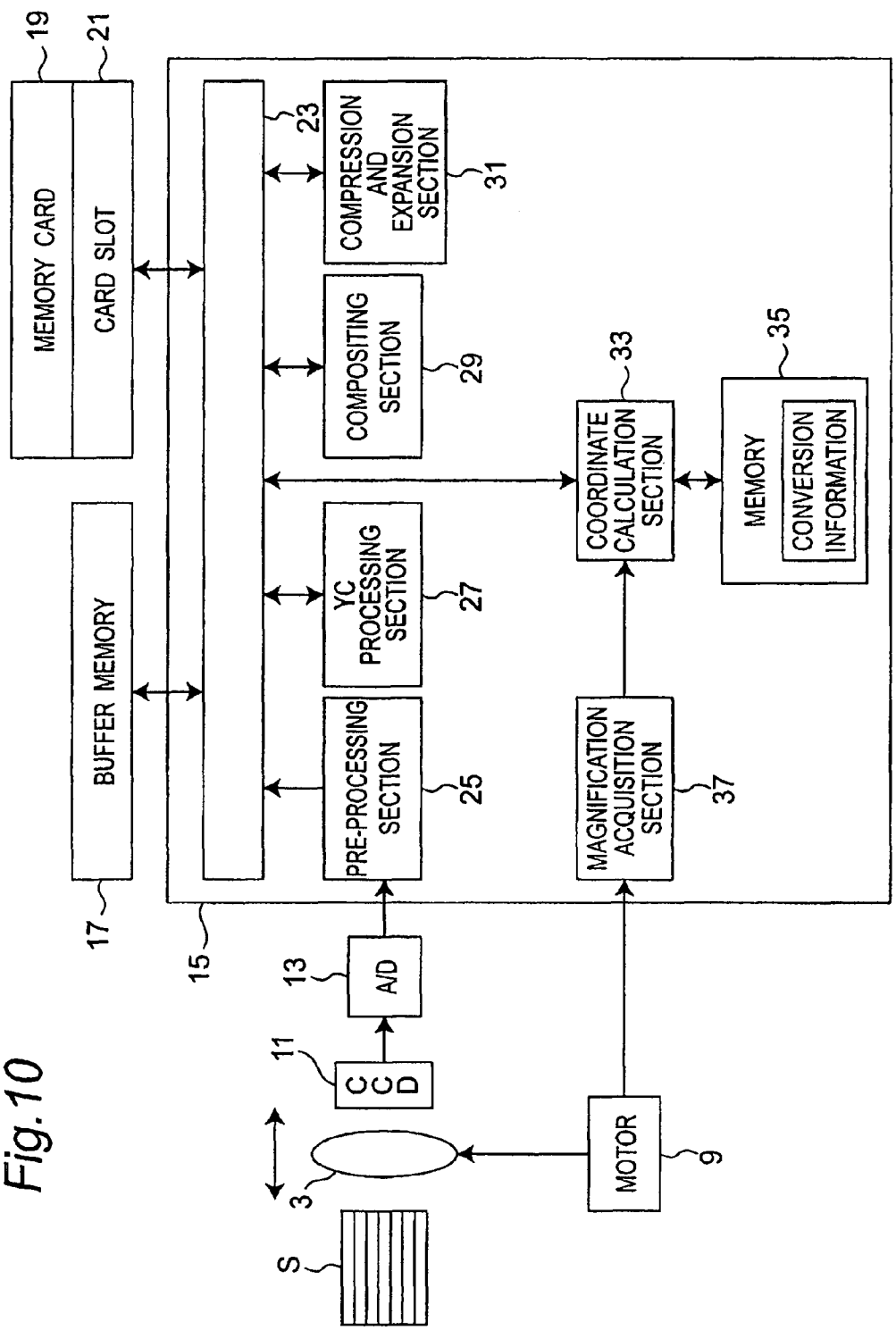
FIG. 10 is a view showing a configuration of an imaging apparatus according to a third embodiment of the present invention.

FIG. 10 is a view showing the configuration of the imaging apparatus of further another embodiment of the present invention.

The imaging apparatus includes a lens 3, a CCD 11 which is an imaging element for converting optical information into the electrical signal, an AD converter 13 for converting the analogue signal into the digital signal, an image processing circuit 15 for controlling overall operation of the imaging apparatus, a buffer memory 17 for temporarily storing the image data before/after distortion correction, and a card slot 21 to be loaded with a memory card 19. The imaging apparatus further has the motor 9 for moving the lens 3 in the focus operation and the zoom operation.

The image processing circuit 15 includes a memory controller 23 for controlling operation of each processing section in the image processing circuit 15, a pre-processing section 25 for applying pre-processing such as a gamma correction to the image information, a YC processing section 27 for performing YC processing, a compositing section 29 for performing interpolation for the distortion correction processing, and a compression and expansion processing section 31 for applying compression/expansion processing to the image. The image processing circuit 15 further includes a coordinate calculation section 33, a memory 35, and a magnification acquisition section 37. Note that in this embodiment, the memory controller 23, the compositing section 29, the coordinate calculation section 33, and the memory 35 compose a correction processing section.

The coordinate calculation section 33 has a function of calculating the inverse-mapping $f^{-1}$ for the distortion correction. The magnification acquisition section 37 acquires the information regarding a zoom magnification from the motor 9. The memory 35 stores information necessary for calculating the inverse mapping $f^{-1}$ (information regarding the function of the inverse mapping $f^{-1}$ under various conditions).

The operation of the imaging apparatus thus configured will be explained.

In the imaging apparatus, optical information inputted through the lens 3 is converted into an analogue electrical signal by the CCD 11. The AD converter 13 converts the analogue electrical signal from the CCD 11 into image information of the digital signal. The image processing circuit 15 receives the image information of the digital signal from the AD converter 13 to apply a predetermined image processing thereto, and then records it in the memory card 19.

More specifically, in the image processing circuit 15, the pre-processing such as a gamma correction is applied to the image data from the AD converter 13 by the pre-processing section 25, and the YC processing is applied thereto by the YC processing section 27. The image data that has undergone such processing is stored in the buffer memory 17.

Next, the distortion correction is made to the image data stored in the buffer memory 17 by the compositing section 29 and the coordinate calculation section 33, and the like. The image data after distortion correction is stored in the buffer memory 17 again.

Next, details of the distortion correction processing by the imaging apparatus of this embodiment will be explained.

First, with reference to FIG. 11, an outline of the distortion correction processing by the imaging apparatus of this embodiment will be explained. In the distortion correction processing of this embodiment, while all pixels composing the output data are sequentially scanned, the processing as described below is performed for each pixel.

A corresponding point P on the input coordinate system of the original data is obtained by the inverse-mapping $f^{-1}$ with respect to an output coordinate point xo on the output data. Next, a value of the pixel data of the corresponding point P is obtained by interpolation using the pixel data of the input coordinate point in the vicinity of the corresponding point P on the original data. Then, a value of the pixel data of the corresponding point P thus obtained is defined as the pixel data of the output coordinate point xo.

Figure 11:
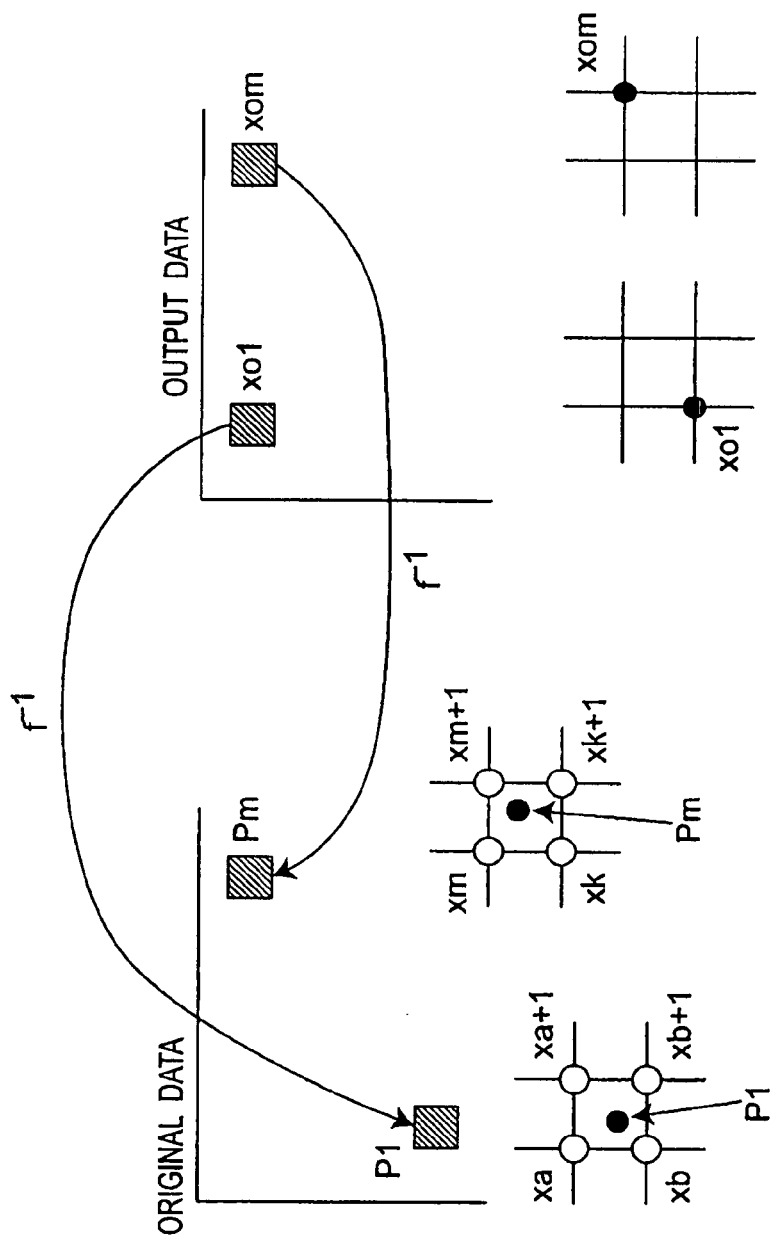
FIG. 11 is a view for explaining a concept of the distortion correction processing in the third embodiment.

For example, the pixel data of an output coordinate point x01 in FIG. 11 is obtained as follows. The inverse-mapping $f^{-1}$ of the output coordinate point x01 is calculated to obtain a corresponding point P1 ($=f^{-1}$ (x01)) on the original data. Then, the value of the pixel data of the corresponding point P1 is obtained, by interpolating (compositing) pixel data of input coordinate points xa, xa+1, xb, xb+1 that exist around the corresponding point P1. Regarding another output coordinate point x0m, a corresponding point Pm is similarly obtained, and pixel data of the corresponding point Pm is obtained with interpolation using input coordinate points xm, xm+1, xk, xk+1 that exist around the corresponding point Pm.

Output coordinate points x01 and x0m whose pixel data is obtained in the above-described method, definitely exist on the lattice point of the output coordinate system. Therefore, a phase does not become discontinuous in the output data, and a deterioration of an image quality due to discontinuity does not occur.

Figure 12A:
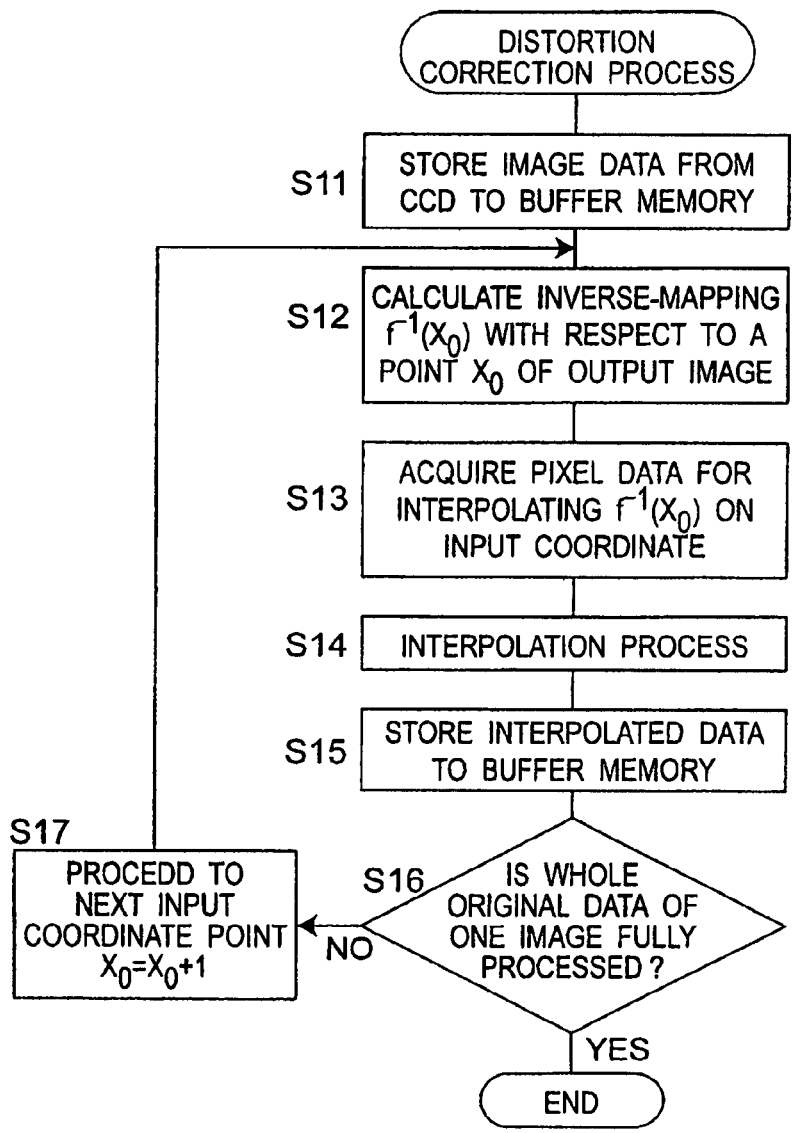
FIG. 12A is a flowchart of the distortion correction processing by the imaging apparatus of the third embodiment.
Figure 12B:
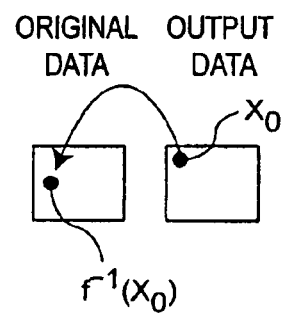
FIG. 12B is a view showing an inverse mapping from output data to original data.

FIG. 12 is a flowchart showing the distortion correction processing by the imaging apparatus of this embodiment.

The image data imaged by the CCD11 is subjected to a predetermined processing by the pre-processing section 25 and the YC processing section 27 and thereafter stored to the buffer memory 17 as original data (S11). The coordinate calculation section 33 calculates the inverse-mapping point $f^{-1}$ (x0) for one output coordinate point x0 (S12). At this time, the coordinate calculation section 33 acquires an appropriate inverse-mapping function $f^{-1}$ from conversion information stored in the memory 35, based on magnification information from the magnification acquisition section 37.

With reference to the inverse-mapping point $f^{-1}$ (x0) thus calculated, the memory controller 23 acquires from the buffer memory 17 pixel data of the input coordinate point used for the interpolation (composition) for obtaining pixel data of the inverse-mapping point $f^{-1}$ (x0) (S13). For example, when the inverse-mapping point $f^{-1}$ (x0) is an inverse-mapping point P1 in FIG. 11, the pixel data of the input coordinate points xa, xa+1, xb, and xb+1 around the inverse-mapping point P1 is acquired.

The memory controller 23 interpolates (composites) the pixel data thus obtained, and obtains the pixel data of the inverse-mapping point $f^{-1}$ (x0) (S14). The pixel data thus obtained by interpolation is recorded in the buffer memory 17 as distortion-corrected data for the output coordinate point x0 (S15).

The memory controller 23 performs similarly the processing to the next output coordinate point of the output data (S16 and S17). The aforementioned processing is repeated until all of the output coordinate points of the output data have undergone the aforementioned correction processing. Note that during inverse-mapping, the output data is scanned for every line sequentially from the output coordinate point of the upper left end of the image for every line and from the left in the line. The distortion-corrected image data is obtained in the above method.

As described above, in the imaging apparatus of this embodiment, the inverse-mapping point in the original data corresponding to the output coordinate point of the output data is obtained, and then, using the pixel data in the vicinity of the inverse-mapping point, the pixel data of the output coordinate point is obtained. The pixel data obtained in such a method definitely exists on the lattice point in the output coordinate system. Therefore, the phase does not become discontinuous in the output data, and an excellent image without deterioration caused by the distortion correction can be obtained.

Fourth Embodiment

Figure 13:
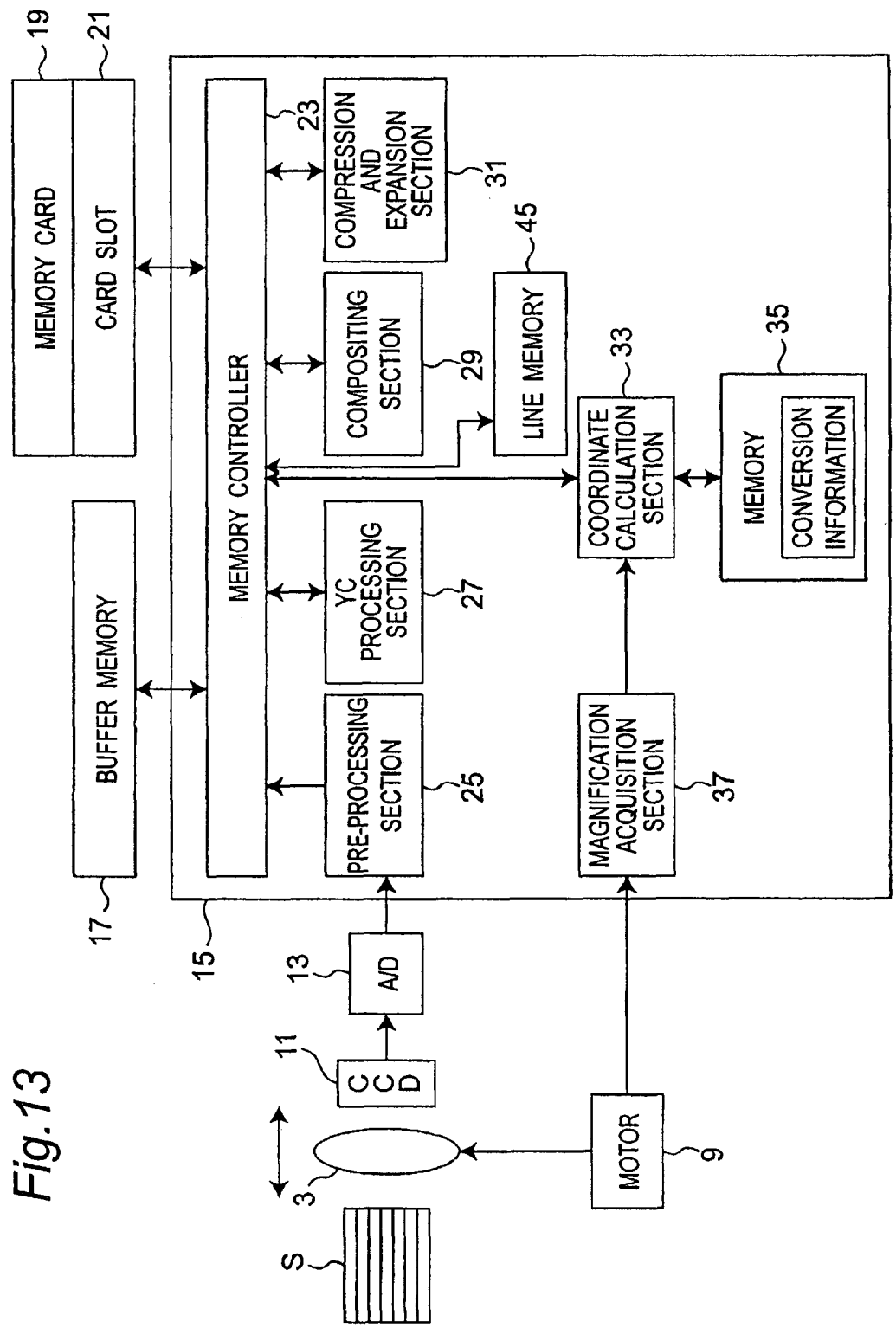
FIG. 13 is a view showing the configuration of the imaging apparatus according to a fourth embodiment of the present invention.

FIG. 13 is a view showing the configuration of the imaging apparatus of still another embodiment of the present invention.

The imaging apparatus of this embodiment further includes a line memory 45 in addition to the configuration as shown in FIG. 10. The line memory 45 stores data of the input image (image to be subjected to the distortion correction) for a predetermined number of lines. Especially, in this embodiment, the line memory 45 stores data of the input image for two lines. A basic operation of the imaging apparatus of this embodiment is the same as that of the aforementioned embodiment, except for processing of distortion correction. Note that in this embodiment, the memory controller 23, the compositing section 29, the coordinate calculation section 33, the memory 35, and the line memory 45 compose a correction processing section.

Figure 14:
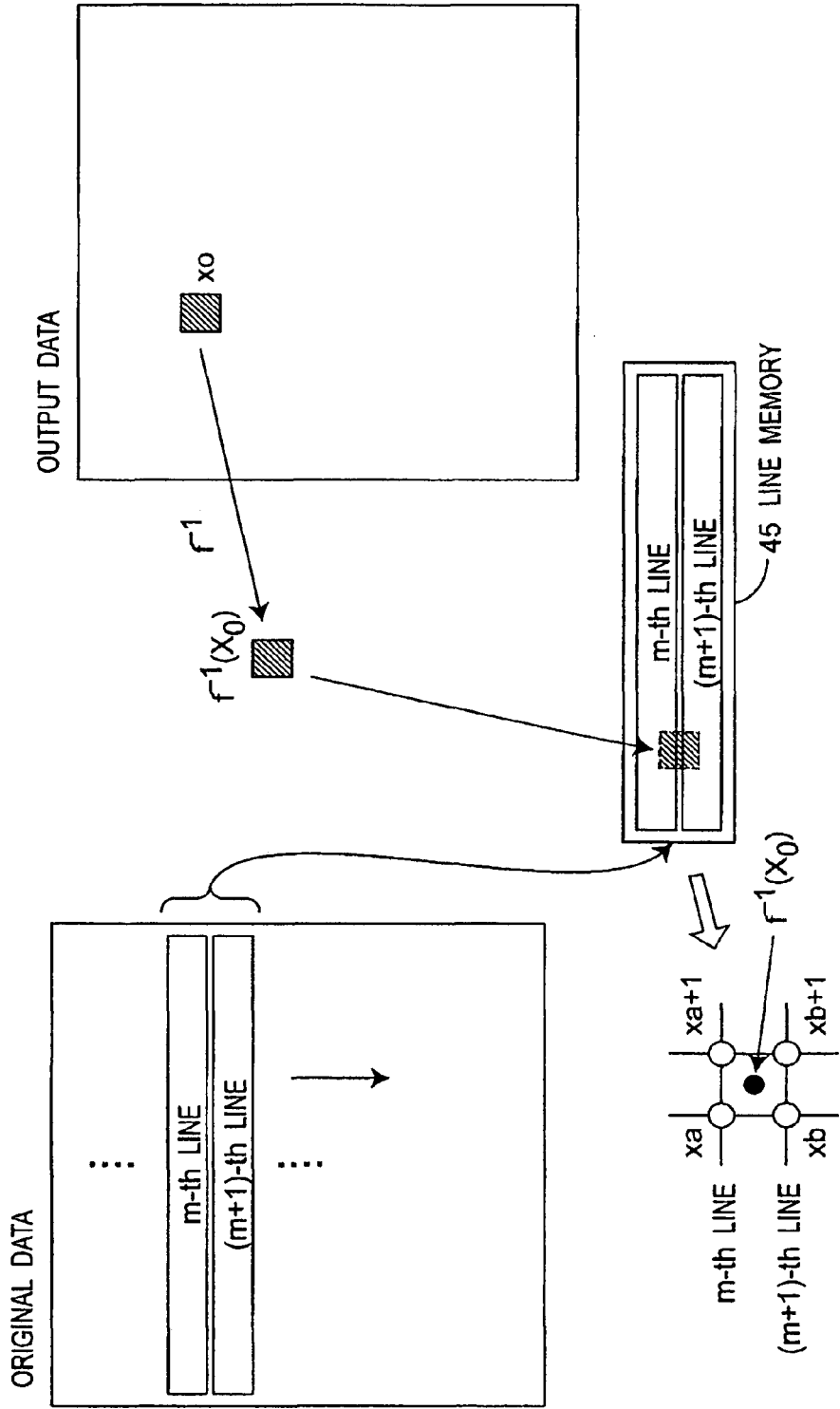
FIG. 14 is a view for explaining the distortion correction processing in the fourth embodiment.

With reference to FIG. 14, an outline of the distortion correction processing of the imaging apparatus of this embodiment will be explained.

The line memory 45 stores two lines of data (referred to as "input line data" hereafter) of the original data which is read from the buffer memory 17. While all output coordinate points composing the output data (pixels of the output image) are sequentially scanned, the following processing is performed for each output coordinate point.

The inverse-mapping point $f^{-1}$ (x0) is obtained for one output coordinate point x0 on the output data. Then, it is determined whether or not the inverse-mapping point $f^{-1}$ (x0) thus obtained exists in an image area shown by input line data stored in the line memory 45 (referred to as "input line area"). When the inverse-mapping point f1 (x0) exists in the input line area, the interpolation (composition) is performed using the value of the pixel data of the input coordinate points stored in the line memory 45 and located around the inverse mapping point $f^{-1}$ (x0), and the value of the pixel data in the inverse-mapping point $f^{-1}$ (x0) is obtained. The value thus obtained is defined as the pixel data of the output coordinate point x0.

Figure 15:
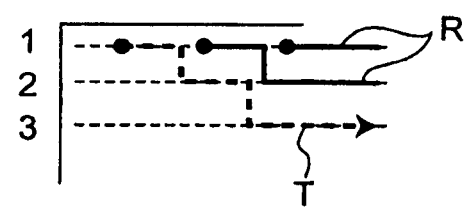
FIG. 15 is a view for explaining a scanning direction of pixels on an output image in the fourth embodiment.

Here, when the inverse-mapping point $f^{-1}$ exists outside the input line area, the processing is advanced to the next output coordinate point. Here, the next output coordinate point is defined sequentially by following a route along the circumference of the area, avoiding an already interpolated (composited) area in the output data. For example, as shown in FIG. 15, center areas R of the first and second lines are already interpolated, and therefore as shown by a broken line T, the route along the circumference of the areas R is determined, and the output coordinate point along this line is sequentially advanced or selected. In this way, sequentially determining the coordinate point to be corrected so as to follow the route along the already interpolated area, can avoid duplicate processing for the already processed coordinate point, thus resulting in reduction of a useless processing and improvement of a processing efficiency.

While the interpolation is executed to the output coordinate point being selected in the above-described method, when the processing of the last output coordinate point on the first line (right end of the image) is finished, the input line data in the line memory 45 is advanced by one line. Note that being advanced by one line means that the input line data in the line memory 45 is updated to data of m+1-th line and m+2-th line, when the line memory 45 stores data of m-th line and m+1-th line before the advance.

Figure 16:
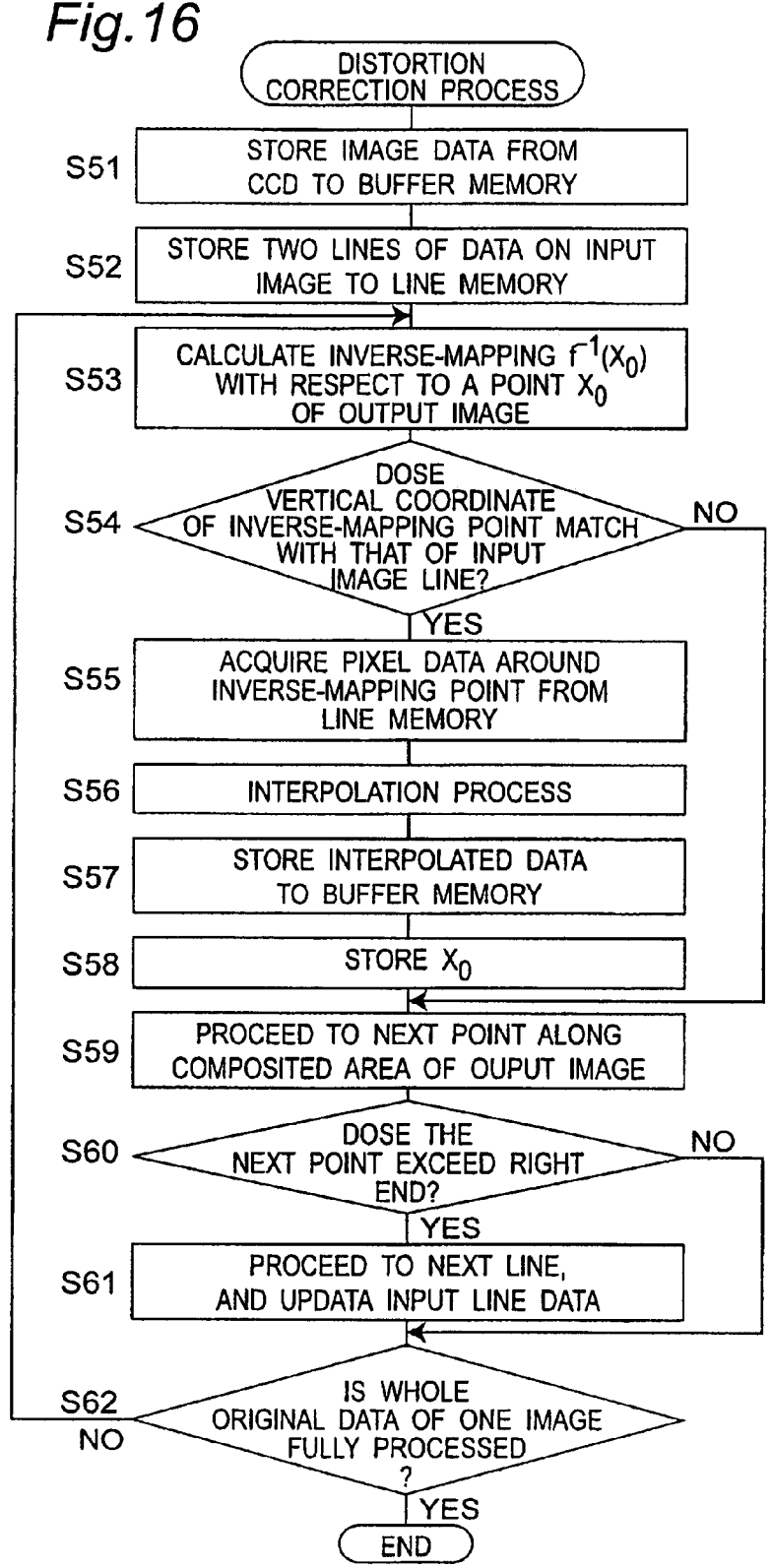
FIG. 16 is a flowchart of the distortion correction processing by the imaging apparatus of the fourth embodiment.
Figure 19:
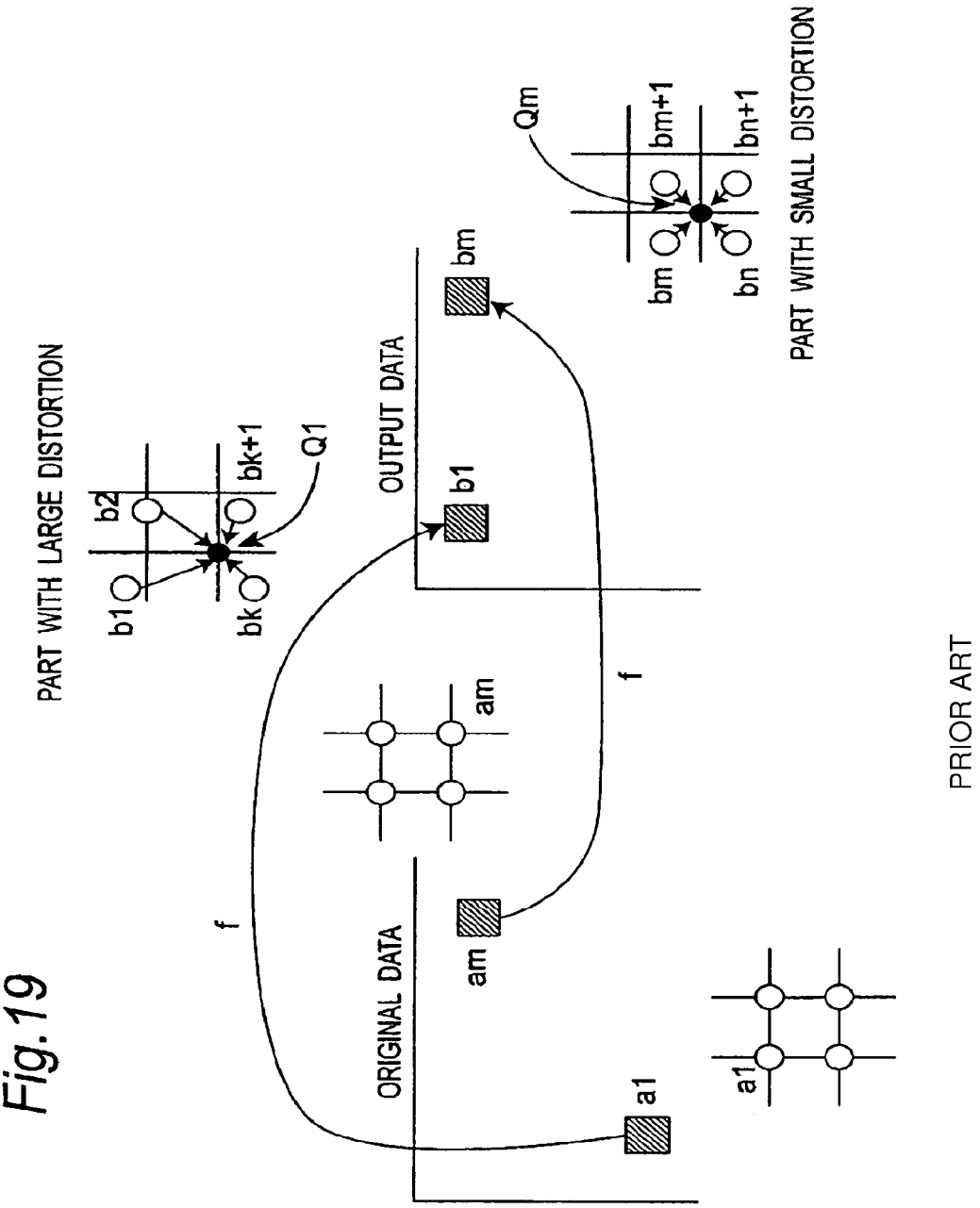
FIG. 19 is a view for explaining a conventional distortion correction processing.

With reference to a flowchart of FIG. 16, details of the distortion correction processing by the imaging apparatus of this embodiment will be explained.

The image data imaged by the CCD11 is stored to the buffer memory 17 as original data, after subjected to a predetermined processing by the pre-processing section 25 and the YC processing section 27 (S51). Next, under the control of the memory controller 23, data of the first two lines of the original data is stored in the line memory 45 as the input line data (S52).

The inverse-mapping point $f^{-1}$(x0) for one output coordinate point x0 is calculated by the coordinate calculation section 33 (S53). At this time, the coordinate calculation section 33 acquires an appropriate inverse mapping function $f^{-1}$ from conversion information stored in the memory 35 based on the magnification information from the magnification acquisition section 37.

The memory controller 23 determines whether or not vertical coordinates of the calculated inverse-mapping point $f^{-1}$ (x0) coincide with the vertical coordinates of the input line data stored in the line memory 45 (S54). Namely, the memory controller 23 determines whether or not the inverse-mapping point $f^{-1}$ (x0) exists in the input line area.

When the aforementioned both vertical coordinates do not coincide with each other, namely, when the inverse-mapping point $f^{-1}$ (x0) is outside the area of the pixels stored in the line memory 45, the processing is advanced to the next output coordinate point (S59). At this time, the next output coordinate point is determined to advance along the already interpolated (composited) area (see FIG. 15). For example, information of the already interpolated (composited) area in the output coordinate points may be stored, and it may be determined whether the interpolation (compositing) has been performed or not. Alternatively, information indicating a border between already interpolated area and not interpolated area may be stored, and the new output coordinate point may be selected based on the information. For example, while scanning not interpolated area, information of "DOWN" may be stored, which is related to a pixel of which next not interpolated area is on a lower line, and information of "UP" may be stored, which is related to a pixel of which next not interpolated area is on an upper line. When scanning a certain line, new output coordinate point may be advanced sequentially by moving a scanning line up and down based on the information of "DOWN" and "UP" of a line just before the certain line.

When the output coordinate point thus advanced exceeds the right end of the output image, the line of the image data stored in the line memory 45 is advanced by one line (S61). Namely, the input line data in the line memory 45 is updated from data of m-th line and m+1-th line to data of m+1-th line and m+2-th line. Thereafter, it is determined whether or not the inverse-mapping point $f^{-1}(x0)$ of the next input line data exists in the input line area in the same method as that described above (S53 to S54).

When the inverse-mapping point $f^{-1}(x0)$ exists in the input line area (YES in S54), the memory controller 23 acquires the pixel data of the pixel in the vicinity of the inverse mapping point $f^{-1}(x0)$ in the input line data (S55). The compositing section 29 performs interpolation (composition) using the pixel data thus acquired, to obtain the pixel data of the inverse mapping point $f^{-1}(x0)$ (S56).

The memory controller 23 records the pixel data thus obtained by the interpolation to the buffer memory 17, as the data of the output coordinate point x0 with distortion corrected (S57). Then it stores the output coordinate point x0 to the memory 35 as information of the already interpolated (composited) output coordinate point (S58). With reference to the information thus stored, the memory controller 23 can avoid the already processed output coordinate point and can determine the next output coordinate point in step S59.

Thereafter, the processing is advanced to the next output coordinate point (S59), and the aforementioned processing is continued to each output coordinate point until the processing of the data of whole image is finished (S62).

With reference to FIGS. 17A to 17E, change of the input line data in the line memory 45 and progress of the output coordinate point in the output data will be explained with specific examples. As shown in FIG. 17A, image areas A, B, C, and D in the output data are considered. It is assumed that, for the areas A, C, and D, the output coordinate points (pixels of the output image) thereof are subjected to the interpolation processing using data of the third and fourth line of the original data, and for the area B the output coordinate points are subjected to the interpolation processing using data of the first and second line of the original data. Note that arrows in the output data in FIGS. 17B to 17E show a progress direction (scan direction) of the output coordinate points to be processed in the output data. In this case, the distortion correction processing of this embodiment progresses as follows.

First, as shown in FIG. 17B, the data of the first and second line of the original data is stored in the line memory 45 as input line data. In the output data, the inverse-mapping point is obtained (or scanned) sequentially from the output coordinate point (the pixel of the output image) of the left end of the area A, and whether or not the inverse-mapping point exists in the input line area is determined. The area A is subjected to interpolation with the data of the third and fourth lines of the original data. Therefore, at the first scan to the output image, the inverse-mapping point of the output coordinate point of the area A exists outside the range of the input line area, and the interpolation processing is not performed. The area B is subjected to interpolation with the data of the first and second lines of the original data. Therefore, the inverse-mapping point of the output coordinate point of the area B exists in the input line area, and the interpolation processing of the output coordinate point of the area B is performed. The interpolation processing of the output coordinate point of the area C is not performed in the same way as the area A.

When the first scan is finished, that is, when the above-described processing is finished for the output coordinate point of the right end of the first line in the output data, as shown in FIG. 17C, the input line data is updated by one line. Namely, the data of the line memory 45 is updated with the data of the second and third lines of the original data. Then, the inverse-mapping point is obtained for the output coordinate point that has not undergone the interpolation, and with reference to the line memory 45 newly updated, the interpolation processing is performed. The scanning direction of the output coordinate point at this time is determined so as to advance along the already interpolated image area (area B). Namely, in the example shown in FIG. 17C, at the second scan, the output coordinate point to be processed is advanced from the area A to the area C through area D. Since in the second scan, the line memory 45 stores the data of the second and third lines of the original data, each output coordinate point of the areas A, C, and D for which interpolation is to be performed using the data of the third and fourth lines of the original data is not interpolated yet even at this time.

When the second scan is finished, as shown in FIG. 17D, the input line data of the line memory 45 is updated with the data of the third and fourth lines of the original data. Then the third scan is carried out. In the third scan, the inverse-mapping point of each output coordinate point of the areas A, D, and C exists in an image range of the data stored in the line memory 45, and therefore at this time, each output coordinate point of the areas A, D, and C is interpolated.

When the third scan is finished, that is, when the interpolation processing of the output coordinate point of the area C which is the right end area is finished, as shown in FIG. 17E, the data of the line memory 45 is updated with the data of the fourth and fifth lines of the original data, and thereafter the same processing is applied to the output coordinate point that has not undergone the interpolation yet.

As described above, in this embodiment, the inverse-mapping point $f^{-1}(x0)$ of each output coordinate point x0 in the output data is compared with the input line data read to the line memory 45, and based on the comparison result, possibility of the correction processing of the output coordinate point x0 is determined.

As described above, according to the imaging apparatus of this embodiment, when the interpolation is performed in the distortion correction processing, the line memory with the capacity capable of storing the input image data of the number of liens required for the interpolation processing may only be provided, and the input image data of a large number of lines is not required to be stored. Therefore, according to the imaging apparatus of this embodiment, a line memory capacity can be reduced, and a simplification in the configuration of the imaging apparatus can be realized.

In addition, according to a conventional method in which a mapping point in the output coordinates to the input pixel is obtained with reference to the coordinate point of the input data, and linear interpolation is applied thereto to obtain the pixel data of the output coordinate points, only an approximate value is obtained because the input coordinate mapped on the output coordinate is linearly distorted. Thus, discontinuity occurs in the output image at a position where the polarity of the error of the output image between the approximate value and a true value reverses. However, according to the imaging apparatus of this embodiment, the inverse-mapping points in the original data corresponding to the output coordinate point of the output data is obtained, and the pixel data of the output coordinate point is obtained using the pixel data in the vicinity of the inverse-mapping point. Therefore, the pixel data obtained in this method becomes a pixel present on the lattice point in a true output coordinate system, and the phase is not discontinuous in the output data. Accordingly, the excellent image without deterioration caused by the distortion correction can be obtained.

It is noted that in the Step S54 of the present embodiment, an example of generating an output pixels using two lines of input pixels. That is, it is determined whether the inverse-mapping point $f^{-1}(x0)$ of the output image exists in the input line area by determining whether the inverse-mapping point $f^{-1}(x0)$ exists in an area of input pixels for two lines. However, the scope of the present invention is not limited to this example. For example, the output pixel may be generated from input pixels for three or more lines. Alternatively, it may be determined whether the inverse-mapping point exists in an area of intermediate line of input pixel ∓0.5 line to determine whether the inverse-mapping point exists in the input line area.

In the present embodiment, similar to the second embodiment, the cache memory 43 may be provided.

The present invention is applicable to an imaging apparatus to take an image using an imaging element, and more particularly to an imaging apparatus for electronically correcting distortion of the image due to lens characteristics.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2006-054943, filed on Mar. 1, 2006, which is expressly incorporated herein by reference in its entirety.

What is claimed is:

1. An image processing apparatus for electrically correcting distortion of an input image to generate an output image, comprising:
a correction processing section configured to sequentially read data of the input image for each pixel in an order of inputting, and perform distortion correction for each pixel of the output image using the read data of each pixel of the input image,
the correction processing section including:
a line memory configured to temporally store data of the input image for a predetermined number of lines, which is a part of the input image;
a controller configured to determine whether data of a plurality of input pixels required for generating data of an output pixel is stored in the line memory; and
an interpolating section configured to, when determining that the data of the plurality of input pixels required for generating data of the output pixel is stored in the line memory, perform interpolation of the data of the plurality of input pixels to generate data of the output pixel for correcting the distortion, the predetermined number being equal to the number of lines on which a plurality of input pixels which are used for the interpolation to generate the data of one output pixel exist,
wherein the correction processing section outputs data of a pixel for which distortion correction is completed in an order different from an order of inputting the data of pixels to the correction processing section based on a predetermined correspondence between pixels of the input image and pixels of the output image.

2. The imaging processing apparatus according to claim 1, wherein
the correction processing section further includes a coordinate calculation section configured to calculate an inverse mapping point on the input image corresponding to a pixel of the output image, and
the controller determines whether the data of the plurality of input pixels required for generating data of an output pixel is stored in the line memory based on the inverse mapping point calculated by the coordinate calculation section.

3. The imaging processing apparatus according to claim 1, wherein the correction processing section uses information regarding the predetermined correspondence that relates a pixel of the input image to a pixel of the output image, which is interpolated using data of the pixel of the input image.

4. The imaging processing apparatus according to claim 1, wherein the correction processing section further include a cache memory for temporally storing data of the pixel for which distortion correction is completed and outputting the data in a page unit.

5. The imaging processing apparatus according to claim 1, wherein the line memory is configured to store data of the input image before distortion correction and to store the data of the pixel for which distortion correction is completed.

6. An imaging apparatus, comprising:
a lens;
an imaging element configured to convert optical information received through the lens into an electrical image information; and
an imaging processing apparatus according to claim 1, configured to electrically correct distortion of image data imaged by the imaging element.

7. A distortion correction method of electrically correcting distortion of an input image to generate an output image, comprising:
sequentially reading data of the input image for each pixel in an order of inputting;
performing, using a correction processing section, distortion correction for each pixel of the output image using the read data of each pixel of the input image to obtain data of each pixel of the output image; and
outputting data of a pixel for which distortion correction is completed in an order different from an order of inputting the data of pixels to the correction processing section based on a predetermined correspondence between pixels of the input image and pixels of the output image,
the performing of distortion correction including:
temporally storing data of the input image for a predetermined number of lines, which is a part of the input image, in a line memory,
determining whether data of a plurality of input pixels required for generating data of an output pixel is stored in the line memory, and
when determining that the data of the plurality of input pixels required for generating data of the output pixel is stored in the line memory, performing interpolation of data of the plurality of input pixels to generate data of the output pixel for correcting distortion, the predetermined number is equal to the number of lines on which a plurality of input pixels which are used for the interpolation to generate the data of one output pixel exist.

8. The distortion correction method according to claim 7, wherein the performing distortion correction further includes:
calculating an inverse mapping point on the input image corresponding to a pixel of the output image, and
determining whether the data of the plurality of input pixels required for generating data of the output pixel is stored in the line memory based on the inverse mapping point calculated by the calculating step.

9. The distortion correction method according to claim 7, wherein performing distortion correction includes determining whether information of a read pixel of the input image is used for correction of a pixel of the output image, with reference to information regarding the predetermined correspondence that relates a pixel of the input image to a pixel of the output image, which is interpolated using data of the pixel of the input image.

10. The distortion correction method according to claim 7, further comprising temporally storing data of the pixel which distortion correction is completed and outputting the data in a page unit.

11. The distortion correction method according to claim 7, further comprising storing in the line memory the data of the input image before distortion correction and the data of the pixel for which distortion correction is completed.

* * * * *